(12) United States Patent
Vaganov

(10) Patent No.: US 8,830,212 B2
(45) Date of Patent: Sep. 9, 2014

(54) SYSTEM AND METHOD FOR DIGITAL RECORDING OF HANDPAINTED, HANDDRAWN AND HANDWRITTEN INFORMATION

(76) Inventor: Vladimir Vaganov, Los Gatos, CA (US)

( * ) Notice: Subject to any disclaimer, the term of this patent is extended or adjusted under 35 U.S.C. 154(b) by 163 days.

(21) Appl. No.: 13/116,008

(22) Filed: May 26, 2011

(65) Prior Publication Data

US 2011/0298709 A1  Dec. 8, 2011

Related U.S. Application Data

(60) Provisional application No. 61/396,648, filed on Jun. 1, 2010.

(51) Int. Cl.
*G06F 3/033* (2013.01)

(52) U.S. Cl.
USPC .......................................... 345/179; 345/158

(58) Field of Classification Search
USPC ................................................. 345/179, 156
See application file for complete search history.

(56) References Cited

U.S. PATENT DOCUMENTS

| | | | |
|---|---|---|---|
| 1,143,393 A | 6/1915 | Higbee | |
| 3,462,548 A | 5/1965 | Rinder | |
| 3,376,551 A | 4/1968 | Armbruster | |
| 3,761,877 A | 9/1973 | Fernald | |
| 3,835,453 A | 9/1974 | Narayanan | |
| 3,904,277 A | 9/1975 | Phillips et al. | |
| 4,345,239 A | 8/1982 | Elliott | |
| 4,364,035 A | 12/1982 | Kirsch | |
| 4,472,710 A | 9/1984 | Suzuki et al. | |
| 4,522,062 A | 6/1985 | Peters | |
| 4,780,707 A | 10/1988 | Selker | |
| 5,027,115 A | 6/1991 | Sato et al. | |
| 5,051,736 A | 9/1991 | Bennett et al. | |
| 5,159,321 A | 10/1992 | Masaki et al. | |
| 5,210,405 A | 5/1993 | Toyoda et al. | |
| 5,371,516 A | 12/1994 | Toyoda et al. | |
| 5,548,092 A * | 8/1996 | Shriver ....................... | 178/19.01 |
| 5,902,968 A * | 5/1999 | Sato et al. .................. | 178/19.01 |
| 6,151,015 A | 11/2000 | Badyal et al. | |
| 6,985,643 B1 | 1/2006 | Fahraeus et al. | |
| 7,221,810 B2 | 5/2007 | Andreasson et al. | |
| 7,318,349 B2 | 1/2008 | Vaganov et al. | |
| 7,367,232 B2 | 5/2008 | Vaganov et al. | |
| 7,476,952 B2 | 1/2009 | Vaganov et al. | |
| 7,554,167 B2 | 6/2009 | Vaganov | |
| 8,149,227 B2 * | 4/2012 | Marggraff et al. ............ | 345/179 |
| 8,297,868 B2 * | 10/2012 | Underwood et al. ......... | 401/195 |

(Continued)

*Primary Examiner* — Lixi C Simpson
(74) *Attorney, Agent, or Firm* — Fitch, Even, Tabin & Flannery LLP

(57) ABSTRACT

The present invention provides method and system for recording hand-painted, hand-drawn and handwritten information defined by a hand and/or fingers movement. The system corresponding to the invented method comprises: a computing device with a display, an input device comprising: an end-point coupled to a force sensor, additional motion sensors, IC circuit for digitizing the information from sensors and processing the data related to the force and motion vectors components; hardware and software for providing a digital description of how the device has been pressed to the surface and how the device has been moved. Besides above mentioned applications the method and system can also be used for precise cursor navigation on the display, computer gaming and as a universal remote control for electronic equipment and appliances or as a security device with multi-level authentication. With an addition of several components the input device can be used as a smart cell-phone.

20 Claims, 30 Drawing Sheets

(56) References Cited

U.S. PATENT DOCUMENTS

| | | |
|---|---|---|
| 2002/0089494 A1* | 7/2002 | Lin ............................... 345/179 |
| 2003/0214490 A1* | 11/2003 | Cool ............................. 345/179 |
| 2004/0047505 A1* | 3/2004 | Ghassabian .................. 382/186 |
| 2006/0279549 A1* | 12/2006 | Zhang et al. ................. 345/173 |
| 2010/0021022 A1* | 1/2010 | Pittel et al. ................... 382/123 |
| 2010/0084203 A1* | 4/2010 | Peng ........................... 178/19.01 |

* cited by examiner

Prior Art

A

B

A

B

SYSTEM AND METHOD FOR DIGITAL RECORDING OF HANDPAINTED, HANDDRAWN AND HANDWRITTEN INFORMATION

CROSS-REFERENCE TO RELATED APPLICATIONS

This application is a Continuation to Provisional Patent Application No. 61/396,648, filed on Jun. 1, 2010, and which is incorporated herein by reference in its entirety and for all purposes.

FIELD OF THE INVENTION

This invention relates to pen-type computer input devices, which allow inputting precise movement of a free-hand and/or fingers in a process of painting, drawing, writing, navigating the objects on a display, computer gaming or as a universal remote control for consumer, educational, professional and other applications.

BACKGROUND

The need in painting, drawing and writing exists as long as the human being himself and will exist as long as human being will exist. The graphical or painted in color image cannot be explained or interpreted by the other means, for example by voice, for inputting in the computer. That is why people are searching and will be always searching for newer technologies satisfying this need.

There are several challenges for solving the problem of free-hand drawing and writing and corresponding requirements for an input control device, which should be a hand held tool: the relative coordinates of the tool movement should be tracked; the tool motion should be precisely controlled by a movement of fingers and/or a hand; in case, when there is no display for continuous monitoring of the drawing or writing and providing a feedback for correction of the exact position of the pen or brush tip, the exact coordinates of the device position should be tracked.

The first requirement is realized in a computer mouse and in theory the mouse can be used for drawing. However it is not convenient because the mouse does not satisfy the second requirement—movement with the fingers. It is not a pen-like device. Pen-type or stylus-type computer input devices are known for more than 25 years. First technologies were based on either passive pad with a coordinate system and an optical device capable to determine the movement of the stylus relative to a coordinate system on the pad or based on the sensitive pad, which can be touched by a pen-type device moved by fingers and/or hand and which can determine the coordinates of the pen. The other technologies were focusing on creating an artificial external "field" (similar to sensitive pad) for determining the position of the pen type device. These fields include light, ultrasound, EM radiation, RF radiation, magnetic field, electrostatic field, etc. If there are two or three sources of this field then it might be possible to determine the position of the pen and interpret it into a trajectory of a pen movement. Disadvantage of all these technologies is a need of additional equipment besides the pen itself, what can be bulky, requires set up operations, etc.

One of the latest technologies is based on optical pattern recognition and uses a special paper with a grid of patterns, which are used as a coordinate system for the pen. Due to the unique combination of the patterns on each page it becomes possible to keep track of the pages and documents. However the need in a special paper or in printing this special paper makes application of this technology limited by digitizing handwritten forms in medical applications, government documents processing and similar applications. This technology still didn't solve the problem of using the napkin for a drawing a sketch of an invention and instantaneously inputting it into a computer.

There was also an attempt to miniaturize the computer mouse to a size and shape of a pen. However, this technology is bulky, expensive, doesn't provide an ink and doesn't provide a sensing the pressure of the pen to the writing surface.

Therefore, there is a need for low-cost simple universal input control device, which can be used as a pen, pencil, brush and joystick and which would not require any additional equipment or special paper.

SUMMARY

A method of recording hand-painted, hand-drawn and handwritten information defined by a hand and/or fingers movement is presented. The invented method comprises the steps of: providing a computing device with a display; providing any surface suitable for writing or drawing; providing an input device having an end-point coupled to an integrated at least two-axis force sensor within the device; moving the device with a hand and/or fingers such that the end-point is contacting the surface during the hand and/or fingers movement relative to the surface while recording with the integrated at least two-axis force sensor the change of the vector force applied to the sensor by the end-point; digitizing this information and processing the data related to the change of the force vector components; providing a description in digital format of how the device has been pressed to the surface based at least in part on the force applied by the end-point to the writing surface; and providing a description in digital format of how the device has been moved over the surface based at least in part on the correlation between the force vector components and corresponding movement vector components.

A corresponding system for recording hand-painted, hand-drawn and handwritten information defined by a hand and/or fingers movement is also presented. A system comprises: a computing device with a display; an input device comprising: an end-point coupled to an integrated at least two-axis force sensor within the device; IC circuit for digitizing the information from three-axis force sensor and processing the data related to the change of the force vector components; hardware and software for providing a description in digital format of how the device has been pressed to the surface based at least in part on the force applied by the end-point to the writing surface; and hardware and software for providing a description in digital format of how the device has been moved over the surface based at least in part on the correlation between the force vector components and corresponding movement vector components, wherein the input device is moving with a hand and/or fingers such that the end-point is contacting the surface suitable for writing or drawing during the hand and/or fingers movement relative to the surface while recording with the integrated at least two-axis force sensor the change of the vector force applied to the sensor by the end-point.

Besides such applications as recording hand-painted, hand-drawn and handwritten information defined by a hand and/or fingers movement presented method and corresponding system can also be used for precise cursor navigation on the display, computer gaming and also as a universal remote control device for controlling different functions in electronic equipment and appliances.

Another interesting application might be a cell-phone. With an addition of several components like mobile processor, microphone, speakerphone and a display this input device can be used as a cell-phone. The ability to digitize the handwritten information can be used instead of a keyboard. The non-verbal response message can be read on a display, which can be flexible and, when it isn't used, be wrapped up around the cylindrical surface of the device.

Yet another application could be a key to the house or office, or car, or anything else to be locked and protected. Handwriting with this device gives an opportunity to realize multi-level authentication of the person who is writing. The image of the signature is the first level of authentication. The velocity of the pen motion, which is also registered, creates the second level of authentication specific to the same person—velocity signature. The acceleration of the pen motion, which is also registered, creates the third level of authentication specific to the same person—acceleration signature. All this information is transferred wirelessly to a receiver and compared to the samples of the signature in the memory of the lock processor. When all three levels are authenticated, the lock will open. There could be some other applications of this input device.

Depending on the company commercializing this technology it can be trademarked in a different way. One option could be, when the first part of these trademarks could use the name, abbreviation of the company or the part of already their existing trademarks and the second part of the trademarks could use one of the following words: paint, draw, pen, brush, tool, etc. For example, one company could use trademarks: i-Paint, i-Draw, i-Pen, i-Brush, i-Tool. Another company could use trademarks: G-Paint, G-Draw, G-Pen, G-Brush, G-Tool, or Paintoogle, or Toogle. The third company could use trademarks: MS-Paint, MS-Draw, MS-Pen, MS-Brush, MS-Tool. The next company could use trademarks: hpaint, hpDraw, hpen, hpBrush, hpTool, etc. Inventor could use such trademarks, as V-Paint, V-Draw, VV-Pen, V-Brush, VV-Tool, etc.

DETAILED DESCRIPTION

Specific embodiments of the invention will now be described in detail with reference to the accompanying figures.

In the following detailed description of embodiments of the invention, numerous specific details are set forth in order to provide a more thorough understanding of the invention. However, it will be apparent to the one of ordinary skill in the art that the invention may be practiced without these specific details. In other instances, well-known features have not been described in detail to avoid unnecessary complicating the description.

OBJECTS AND ADVANTAGES

An object of the present invention is to provide a method of recording hand-painted information defined by a hand and/or fingers movement.

Another object of the present invention is to provide a method of recording hand-drawn information defined by a hand and/or fingers movement.

Another object of the present invention is to provide a method of recording handwritten information defined by a hand and/or fingers movement.

Another object of the present invention is to provide a method of recording handwritten information defined by a hand and/or fingers movement.

Another object of the present invention is to provide a method of navigating objects on a digital screen by a hand and/or fingers movement.

Another object of the present invention is to provide a tool for digital hand-painting defined by a hand and/or fingers movement.

Another object of the present invention is to provide a tool for digital hand-drawing defined by a hand and/or fingers movement.

Another object of the present invention is to provide a tool for digital handwriting defined by a hand and/or fingers movement.

Another object of the present invention is to provide a tool for digital navigating objects on a digital screen defined by a hand and/or fingers movement.

Another object of the present invention is to provide a low-cost simple tool, which can be used as a pen, pencil and brush and would not require any additional equipment or special paper.

Another object of the present invention is to provide a new concept of a smart cell phone, which besides typical features also can be used for inputting information as by pen, pencil and brush and would not require any additional equipment or paper.

Another object of the present invention is to provide an attractive business model for commercializing the tool for digital painting, drawing, writing and navigating objects on a screen.

PREFERRED EMBODIMENTS

Figure 1:
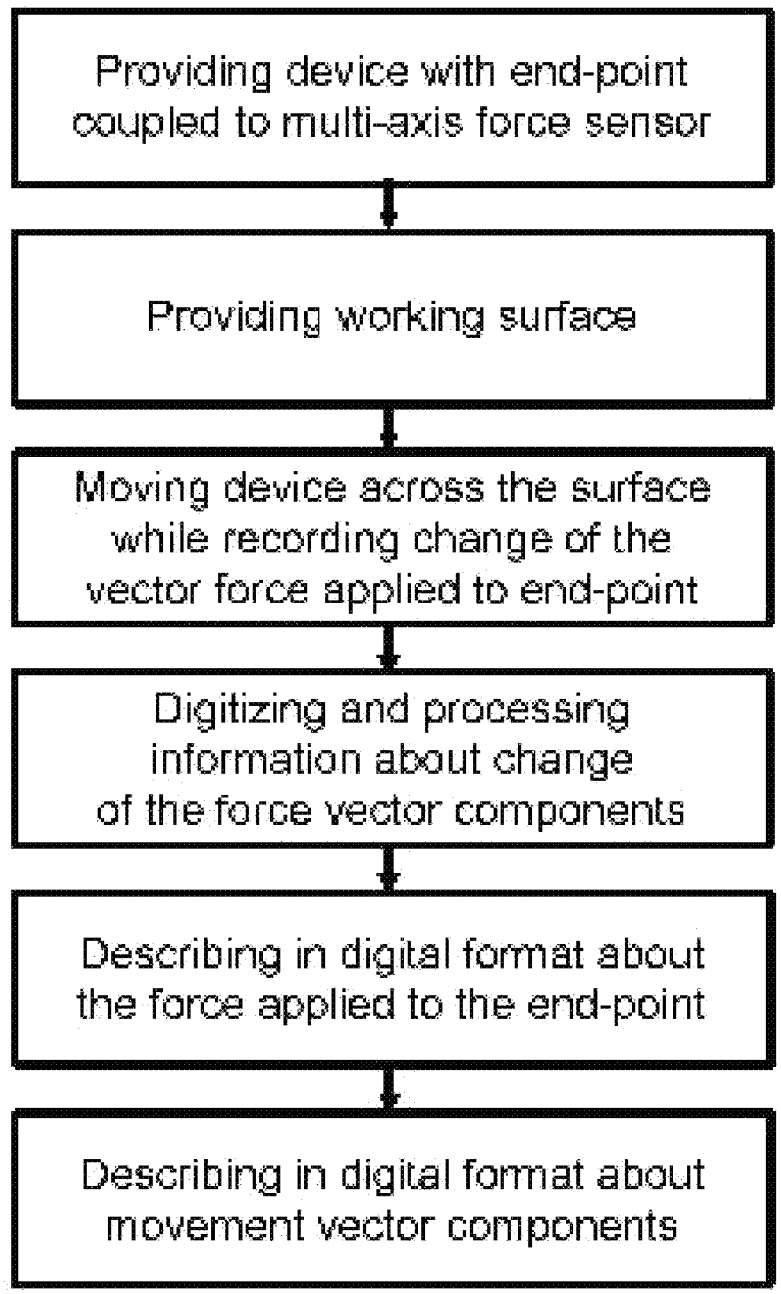
FIG. 1 shows an algorithm of the method for digital recording of handpainted, handdrawn and handwritten information.

Principles of the method of digital recording of hand-painted, hand-drawn and handwritten information and navigating objects on the display defined by a hand and/or fingers movement is illustrated in FIG. 1 and can be described as follows:

providing a computing device with a display;

providing an input device having an end-point coupled to an integrated at least one at least two-axis force sensor within the device;

providing any working surface suitable for moving the device having an end-point across the working surface in a process of painting, drawing, writing or cursor navigating;

moving the input device with a hand and/or fingers such that the end-point is contacting the working surface during the hand and/or fingers movement relative to the surface while recording with the integrated at least one at least two-axis force sensor the change of the vector force applied to the sensor by the end-point;

digitizing this information and processing the data related to the change of the force vector components;

providing a description in digital format of how the input device has been pressed to the working surface based at least in part on the force applied by the end-point to the working surface;

providing a description in digital format of how the input device has been moved over the working surface based at least in part on the correlation between the force vector components and corresponding movement vector components.

Figure 2:
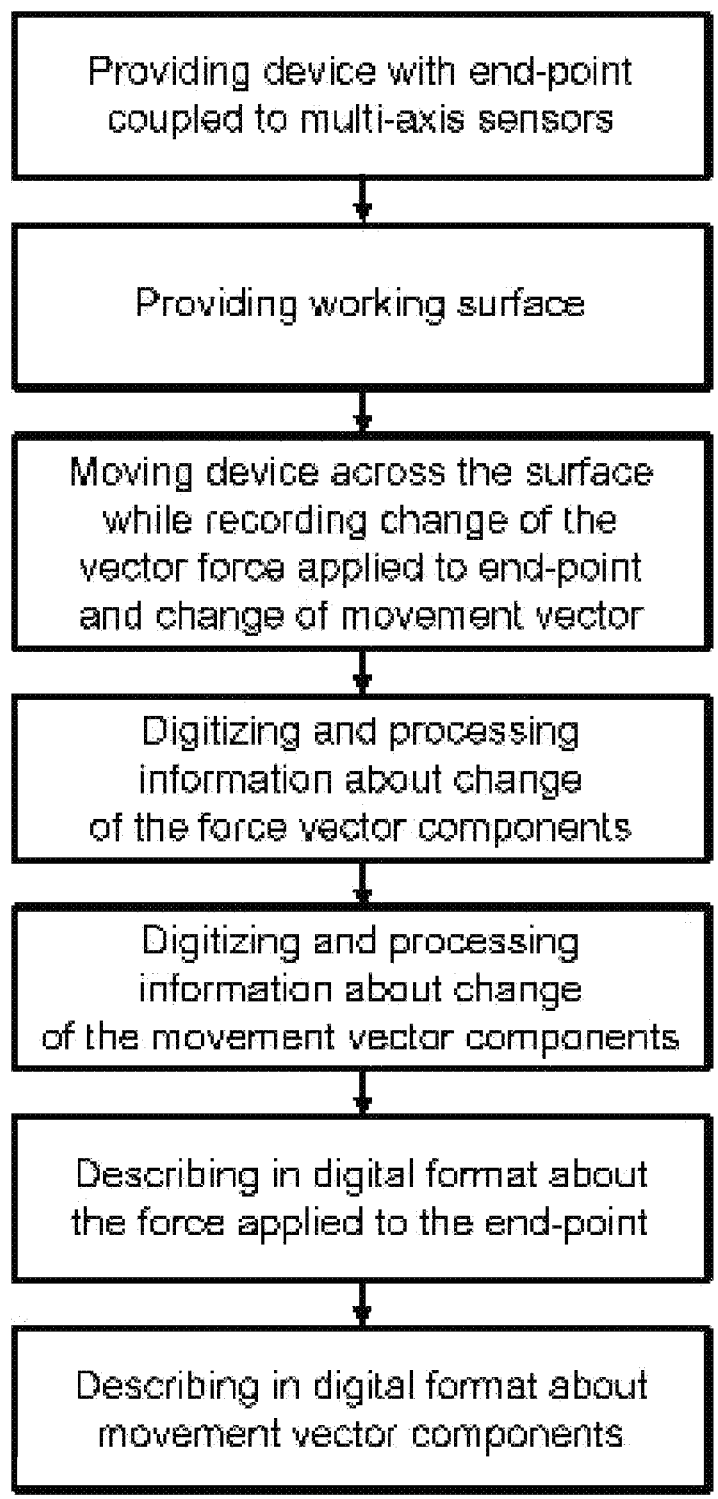
FIG. 2 shows an algorithm of the method for digital recording of handpainted, handdrawn and handwritten information, when information from multiple sensors is used.

This method is based on the determining the motion of the input device on the basis of changing the components of vector force applied to the end-point of the device. Control of the motion and, therefore trajectory of motion, can be significantly improved by using additional motion sensors besides described force sensor. In this case the algorithm of the method will modifies, as illustrated in FIG. 2. The difference compared to the method described above is that the method further comprising the following additional steps:

providing at least one at least two-axis motion sensor within the device;

moving the input device with a hand and/or fingers such that the end-point is contacting the working surface during the hand and/or fingers movement relative to the surface while recording with at least two-axis motion sensor the change of the vector of movement and recording with the integrated at least one-axis force sensor the change of the vector force applied to the sensor by the end-point;

digitizing this information and processing the data related to the change of the movement vector components and force vector components;

providing a description in digital format of how the input device has been moved and pressed to the surface based at least in part on the movement sensor components and force applied by the end-point to the working surface.

The method of digital recording of hand-painted, hand-drawn and handwritten information and navigating objects on the display defined by a hand and/or fingers movement described above can also possess the following properties:

providing an integrated at least one at least two-axis force sensor as an integrated at least one three-axis force sensor;

displaying the hand-painted, hand-drawn and handwritten information and the cursor navigating information on the device chosen from a group: monitor of a computer, display of a mobile device, TV set, a digital projection system or any other device, which has a capability to displaying digital graphical information;

displaying the hand-painted, hand-drawn and handwritten information and the cursor navigating information based on a description in digital format of how the input device has been moved and pressed to the surface and using this displaying for different purposes including using it as a visual feedback in the process of painting, hand-drawing, handwriting and cursor navigating;

identifying the characters of handwritten information with the aid of the description and storing them in character-coded digital format and further comprising displaying the handwritten information based on said description;

indicating on the working surface the movement of the input device;

providing storing the handwritten information by storing said description;

providing a parallel processing of digitizing information and processing the data related to the change of the force vector components and providing a description in digital format of handwritten information;

providing a transceiver selectively operating for wireless transferring digital description of the painting, drawing, handwriting or navigating objects on the display defined by a hand and/or fingers movement to an external device;

providing at least one at least one-axis accelerometer within the device, which having an end-point coupled to an integrated at least one at least two-axis force sensor, and determining whether the input device has been moved over the surface or not based at least in part on the presence of vibrations measured by the accelerometer;

providing at least one at least two-axis accelerometer and determining, on the basis of measurement of acceleration vector, the speed at which the input device has been moved in X and Y directions and the trajectory of the movement between recording of two positions of the end-point on the working surface;

providing at least one three-axis accelerometer within the input device and determining, on the basis of measurement of acceleration vector, the speed, at which the input device has been moved, and the trajectory of the movement between recording of two positions on the end-point on the working surface and the tilt of the pen relative to the vector of gravity:

providing at least one at least one-axis angular rate sensor (gyro) within the input device and determining the angular rate, at which the device has been moved, and the trajectory of the movement between recording of two positions of the end-point on the working surface;

providing at least one two-axis or three-axis angular rate sensor (gyro);

providing at least one additional sensor chosen from the group: one-axis linear accelerometer, two-axis linear accelerometer, three-axis linear accelerometer, one-axis gyro, two-axis gyro, three-axis gyro, one-axis angular accelerometer, two-axis angular accelerometer, three-axis angular accelerometer, one-axis compass, two-axis compass, three-axis compass for determining the motion parameters, at which the device has been moved between recording of two positions on the working surface;

providing a method of obtaining the information from at least one at least two-axis force sensor comprises the steps of: providing a semiconductor substrate sensor chip, said semiconductor sensor chip comprising a frame element, a rigid island element and an elastic element mechanically coupling said frame and said rigid island elements; providing a set of two or more stress-sensitive IC components integrated into the elastic element; coupling at least one force-transferring element from the end-point to a rigid island element of a sensor die; transferring the applied external vector force from the end-point through at least one force-transferring element to the rigid island element of the sensor die, and thereby generating electrical outputs from application the external force vector via stress-sensitive IC components positioned in the elastic element each carrying the unique orthogonal system component of signal from the force vector, where the IC component outputs are functions of input component stresses developed from the orthogonal system force components.

Figure 3:
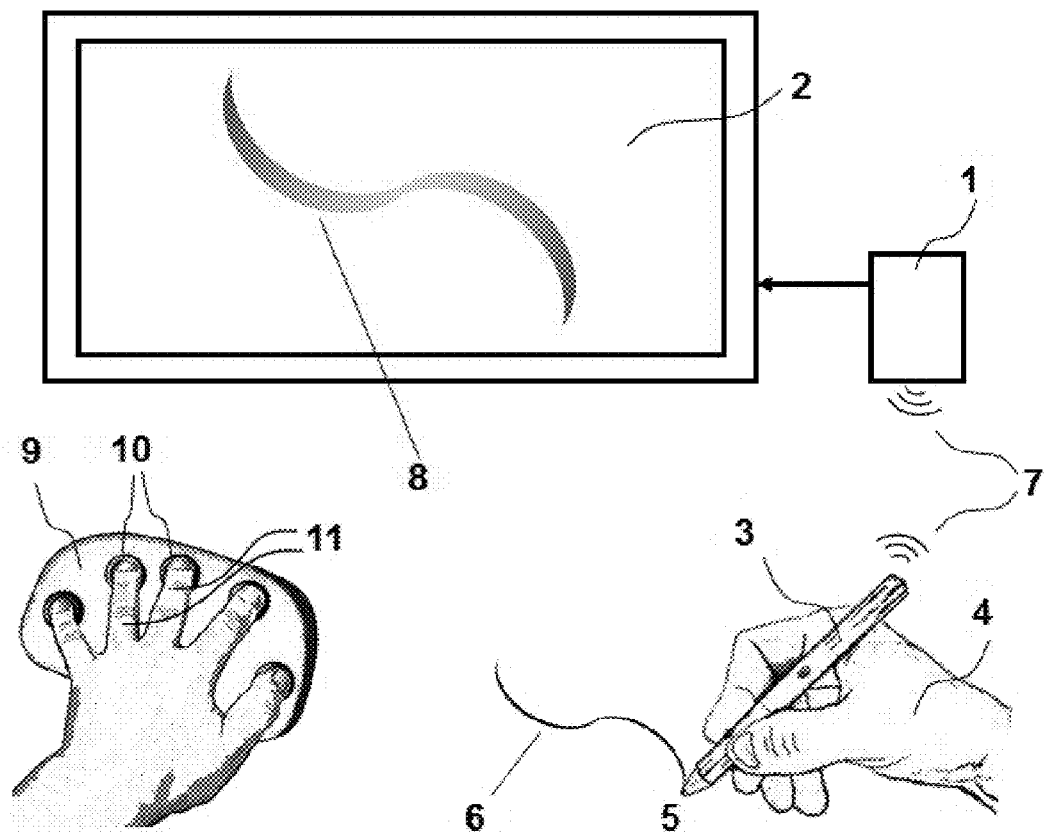
FIG. 3 shows a concept of a system for digital recording of handpainted, handdrawn and handwritten information.

FIG. 3 illustrates a concept of the system for digital recording of hand-painted, hand-drawn and handwritten information. The system consists of a computing device 1 with a display 2. Handheld input control device 3 is moving by hand 4 on any surface suitable for moving the end-point 5 of the input device 3 along the surface. During the painting or drawing some image 6 the motion of the input device 3 is measured by sensors and processed within the device 3 and then transmitted to the computing device 1 through a wireless channel 7. As a result of processing digital information by the computing device 1, the image 8 of the image 6 appears on the display 2. The system can also comprise additional input control device 9, which can have one or several buttons/joysticks 10 controlled by fingers 11. These additional input buttons can be also located on the movable input control. All input control buttons/joysticks could be one, two or three-axis controls providing multiple functions, which can be controlled simultaneously in the process of panting.

Figure 4:
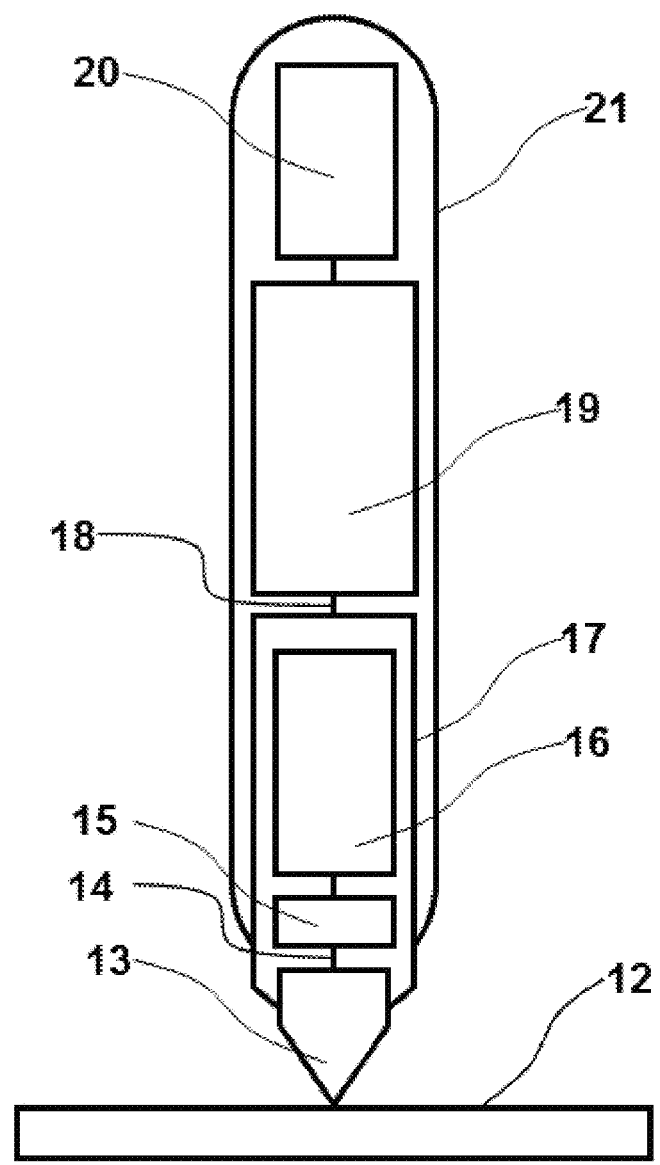
FIG. 4 shows a concept of the input device for digital recording of handpainted, handdrawn and handwritten information.

FIG. 4 illustrates a concept of the input device for digital recording of hand-painted, hand-drawn and handwritten information, which comprises an end-point 13 coupled to an integrated at least one at least two-axis force sensor 15 within the device; IC circuit 16 for digitizing the information from the force sensor and processing the data related to the change of the force vector components; hardware and software 19 for providing a description in digital format of how the device has been pressed to the surface based at least in part on the force applied by the end-point to the writing surface; and hardware and software 19 for providing a description in digital format of how the device has been moved over the surface 12 based at least in part on the correlation between the force vector components and corresponding movement vector components.

The input device is moving with a hand and/or fingers such that the end-point 13 is contacting a surface 12 suitable for such movement across the surface in a process of painting, drawing, writing or cursor navigating while recording with the integrated at least one at least two-axis force sensor 15 the change of the vector force representing the motion of the device and force applied to the sensor by the end-point. The overall housing or body 21 of the input device might have different shape. It can have a shape of a pen, pencil, brush handle, button, pill, thimble, ring, cylinder, rod, plate, parallelepiped, ellipsoid, sphere, semi-sphere, torus, cone, prism, or combination. The device also can comprise a transceiver selectively operating for wireless transferring collected and processed data to an external device.

Interchangeable cartridge 17 might also include a capacity for ink within the device for generating permanent marks on the surface 12 while the end-point 13 is contacting the surface 12 during the hand movement relative to the surface. The cartridge 17 comprises at least the force sensor 15 and electrical contacts 18 for providing power 20 to the sensor and transferring information from the sensor 15 to the digital processing system 16 or 19 within the body 21 of the device. Obviously it can comprise several different sensors.

Figure 5:
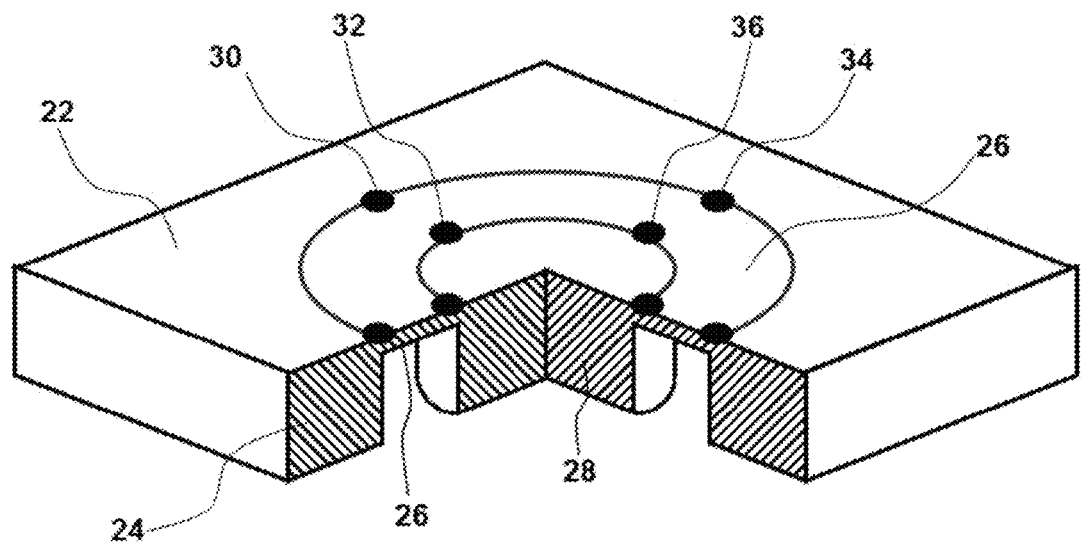
FIG. 5 shows a prior art of the 3-axis force sensor.
Figure 6:
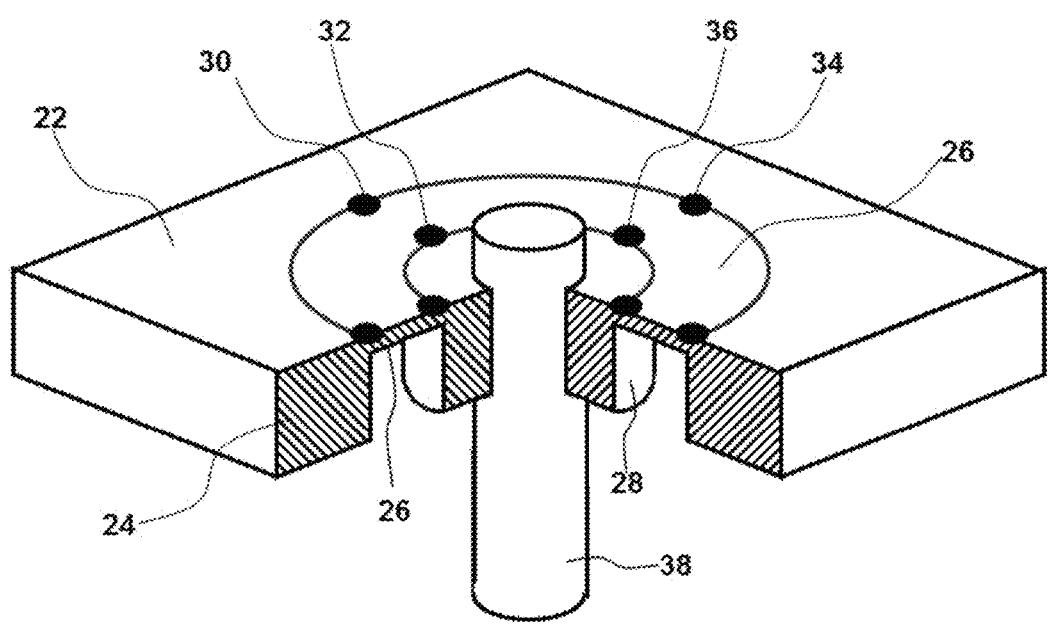
FIG. 6 shows a prior art of the 3-axis force sensor.

FIGS. 5 and 6 present prior art of three-axis integrated force sensors, which in principle can be used within the invented device. FIG. 6 illustrates an example of a force sensor, which can comprises a semiconductor substrate sensor chip 22, which, in its turn, comprises a frame element 24, a rigid island element 28 and an elastic element 26 mechanically coupling said frame and said rigid island elements 28. A set of two or more stress-sensitive IC components 30, 32, 34, 36 are integrated into the elastic element 26. At least one force-transferring element 38 couples the end-point of the input device to a rigid island element 28 of a sensor die 22 for transferring the applied external vector force from the end-point through the force-transferring element 38 to the rigid island element 28 of the sensor die 22, and thereby generating electrical outputs from application the external force vector via stress-sensitive IC components 30-36 positioned in the elastic element 26 each carrying the unique orthogonal system component of signal from the force vector, where the IC component outputs are functions of input component stresses developed from the orthogonal system force components.

Figure 7:
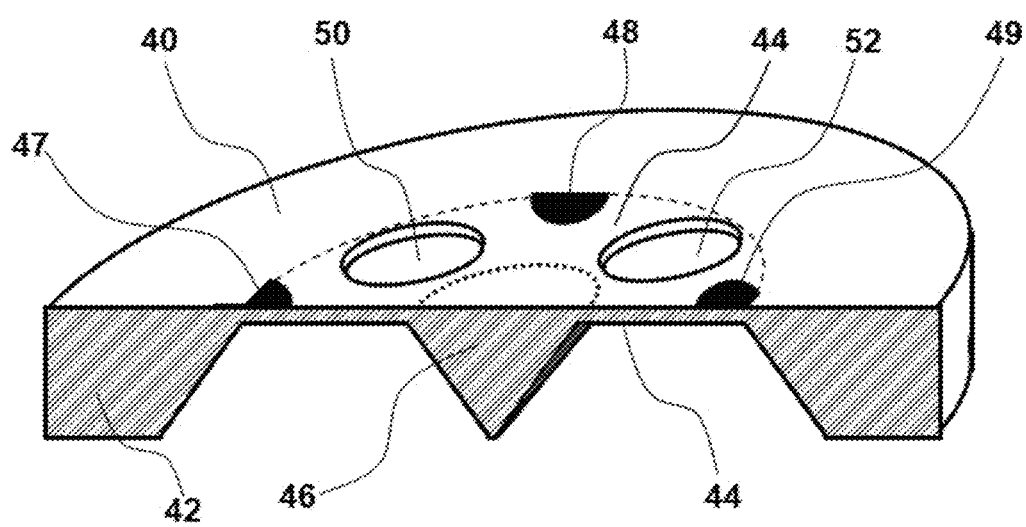
FIG. 7 shows a 3-axis force sensor with openings in the diaphragm for ink supply.

The drawback of prior art designs is the lack of the channel for ink going through the die. This problem can be solved by creating openings 50 and 52 in the diaphragm 44 of the sensor die 40, which couples the frame 42 with the central rigid island 46, as shown in FIG. 7. In some cases a square shape of the sensor die might be less convenient than a round shape of the die 40. Although not always required, the frame 42 and diaphragm 44 can also be round, as shown in FIG. 7.

Figure 8:
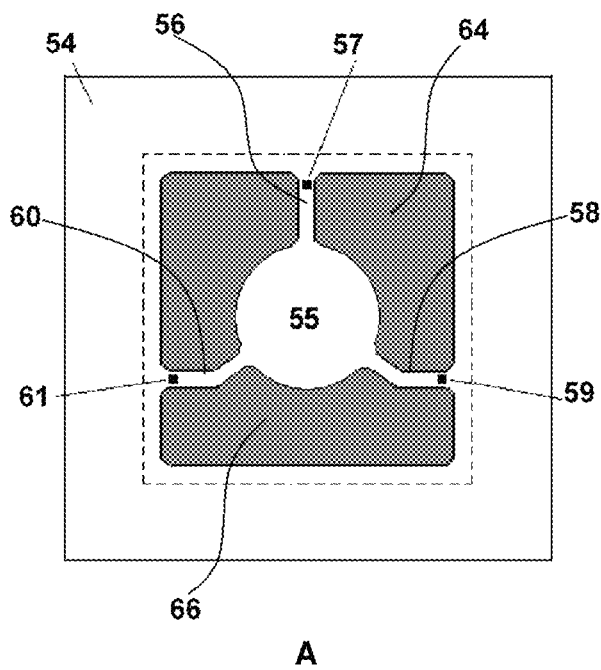
FIGS. 8A and 8B show 3-axis force sensor layout with three and four beams.
Figure 8:
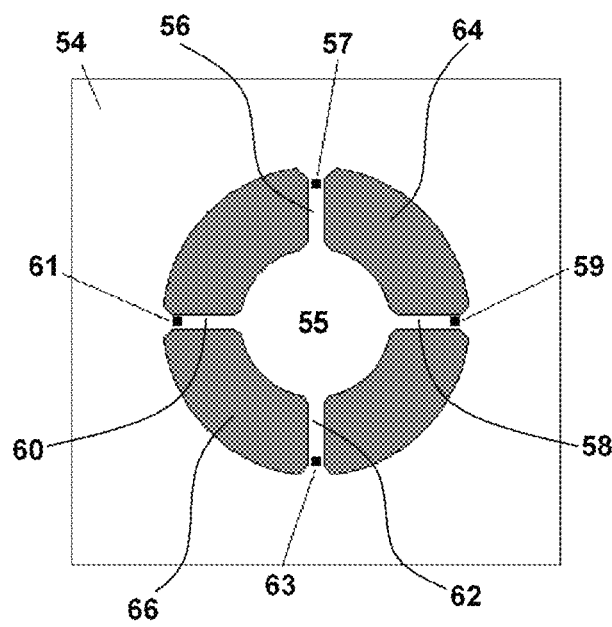
Figure 9:
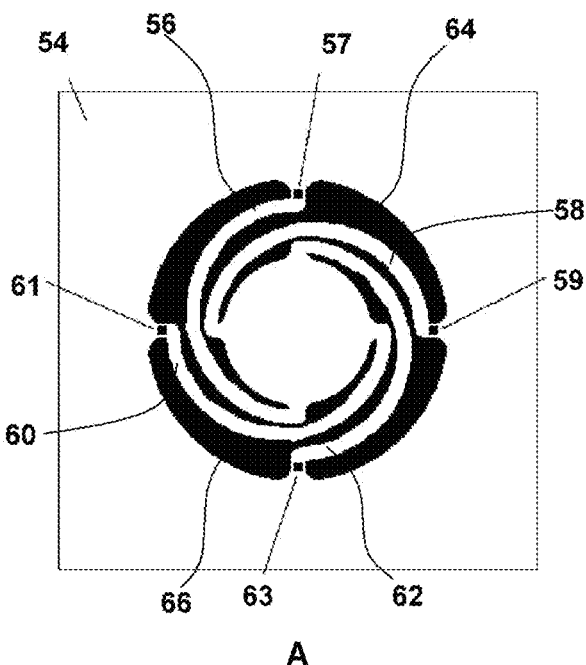
FIGS. 9A and 9B show 3-axis force sensor layout with spiral beams.
Figure 9:
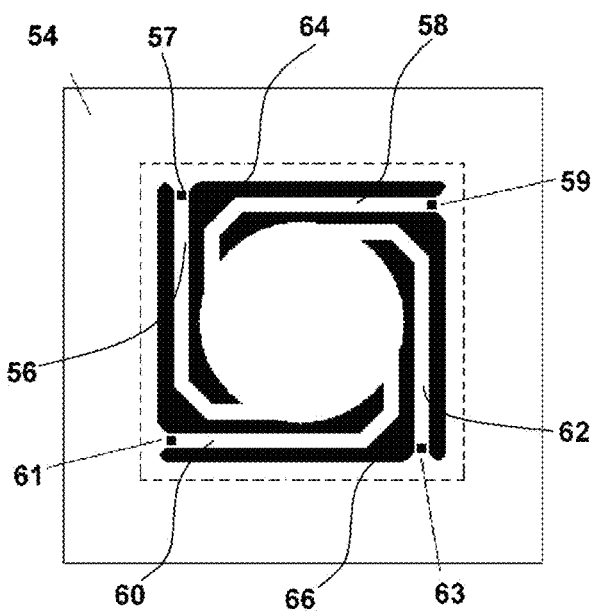

As shown in FIG. 8, the openings 64, 66 in the diaphragm occupy the major area of the diaphragm. In this case the frame 54 is coupled with the rigid island 55 with the beams 56, 58, 60 and 62 instead of a diaphragm. Examples of the force sensor die layout for three-axis force sensors are presented in FIGS. 8A, 8B, 9A and 9B. The last two figures illustrate spiral beams, which can provide larger displacement of the rigid island, which perceives the external force and provide better force overload protection.

Figure 10:
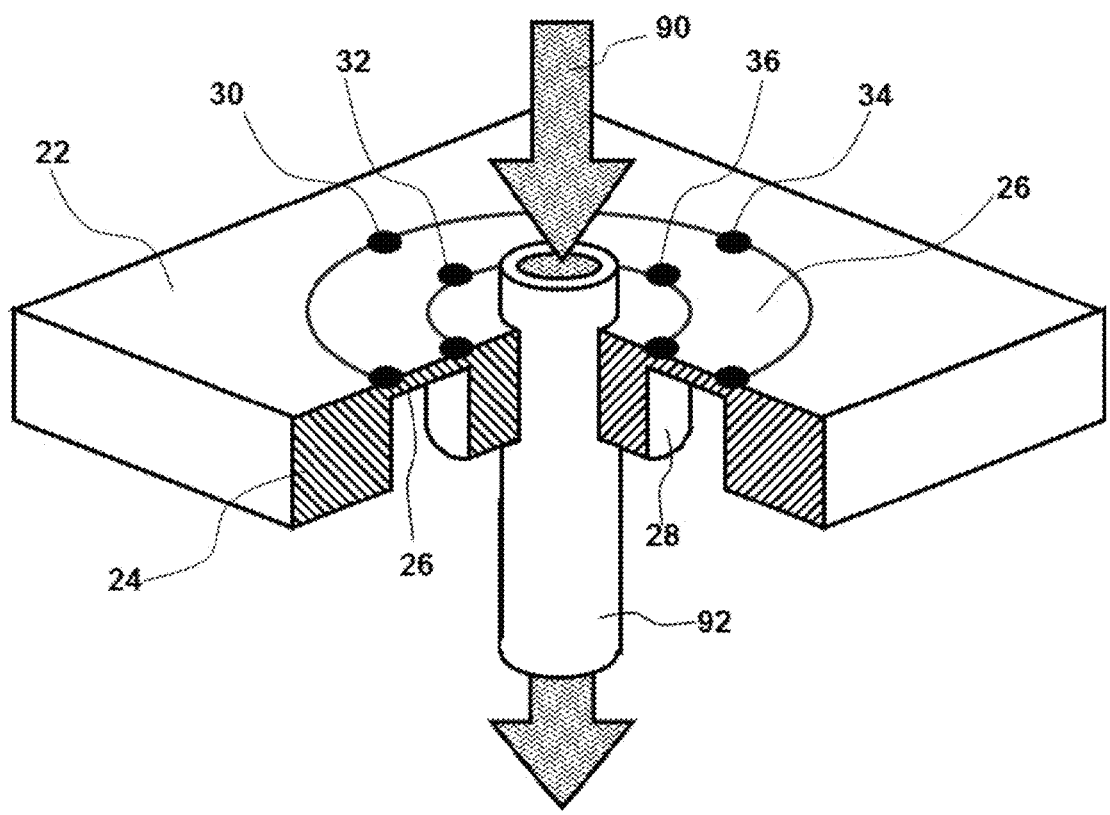
FIG. 10 shows a 3-axis force sensor die with hollow needle connected to the rigid island for force transferring and ink supply.

Another version of providing ink supply through the force sensor die is presented in FIG. 10. The miniature metal tube 92 similar to a hypodermic needle is coupled to rigid island 28 of the force sensor die 22. The ink supply 90 is provided to the top end of the tube 92 to the bottom end contacting the paper. The force during the moving the bottom of the pipe along the paper is applied to the pipe and through the pipe to the rigid island 28 to the force sensor, resulting in the deformation of the diaphragm 26 and corresponding mechanical stress in the location of the stress sensitive components 30-34. The value and the sign of the stress and, therefore the output signals from the stress sensitive components depend on the components of the vector force applied to the end of the pipe. Measuring the output signals from the stress sensitive components it is possible to determine all the components of the vector force and therefore, torn derive some information about direction and trajectory of movement of the end-point of the device.

Figure 11:
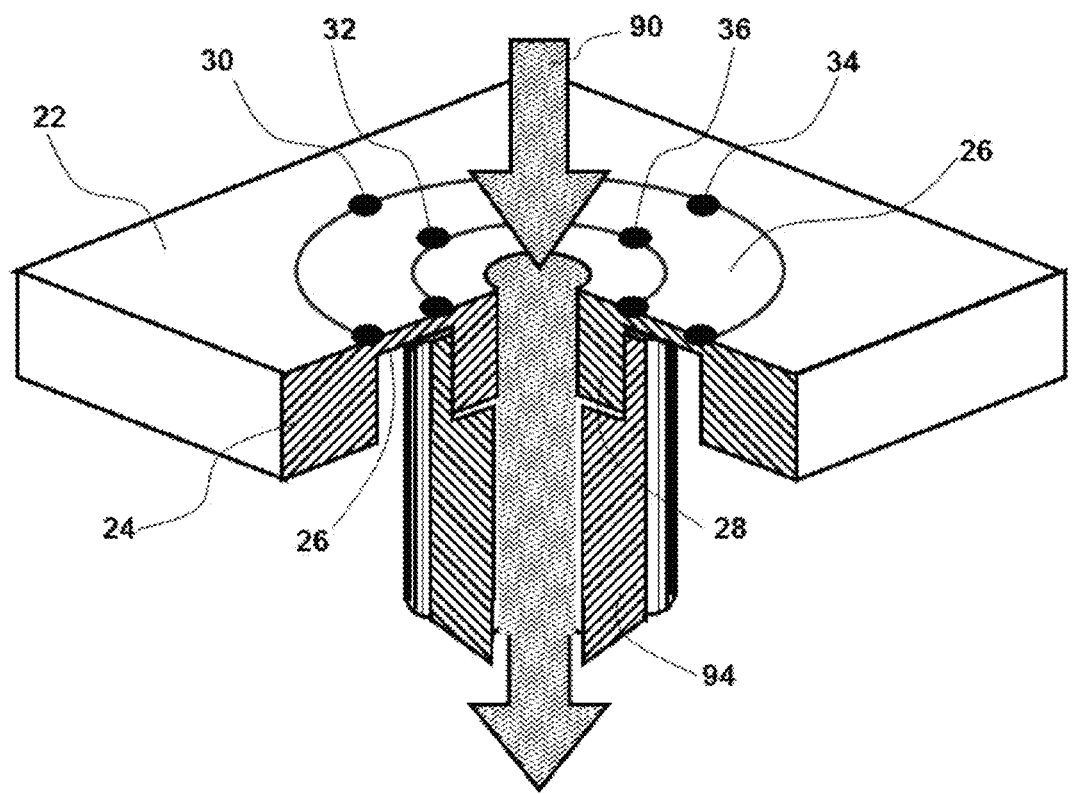
FIG. 11 shows a 3-axis force sensor die with hollow needle put on the rigid island for force transferring and ink supply.

Another version of providing ink supply through the force sensor die is presented in FIG. 11. In this case the pipe 94 with the channel for ink supply 90 is attached to the rigid island 28 of the force sensor die from outside of the island. It allows having larger diameter of the ink channel for the same size of the rigid island 28 and, therefore, the same size of the die 22.

Figure 12:
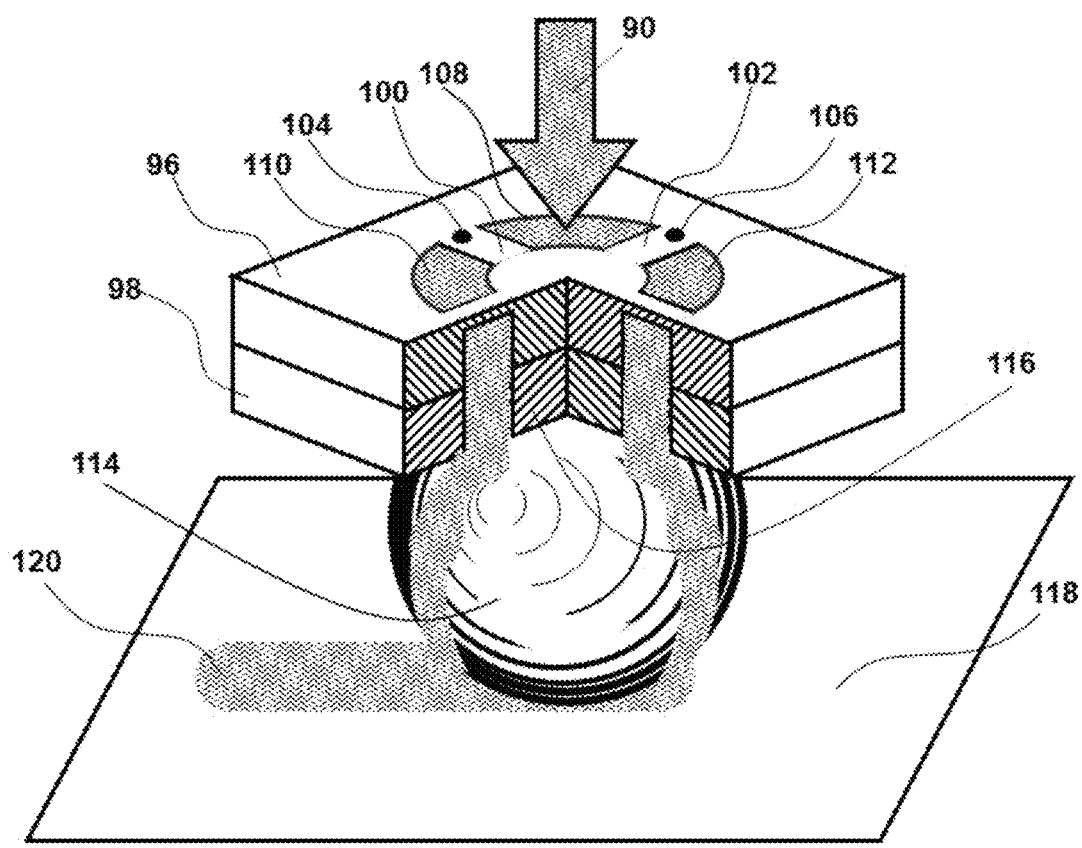
FIG. 12 shows how a small ball contacts a 3-axis force sensor and how ink is supplied for writing on the paper.

Different version of the end-point is presented in FIG. 12. In this case the end-point is a ball 114, which is rotating and sliding on the surface of the paper 118. On the other side the ball 114 touches the sensitive part 116 of the force sensor die 96 bonded to mechanical die 98. Ink supply 90 is provided through openings 108, 110 and 112 in the sensor die. Ink goes to the ball surface and leaves the trace 120 of the ball movement on the paper 118. While rotating in different directions and under different pressure on the top the ball applies different force vectors to the force transferring element 116 of the sensor die 96.

Figure 13:
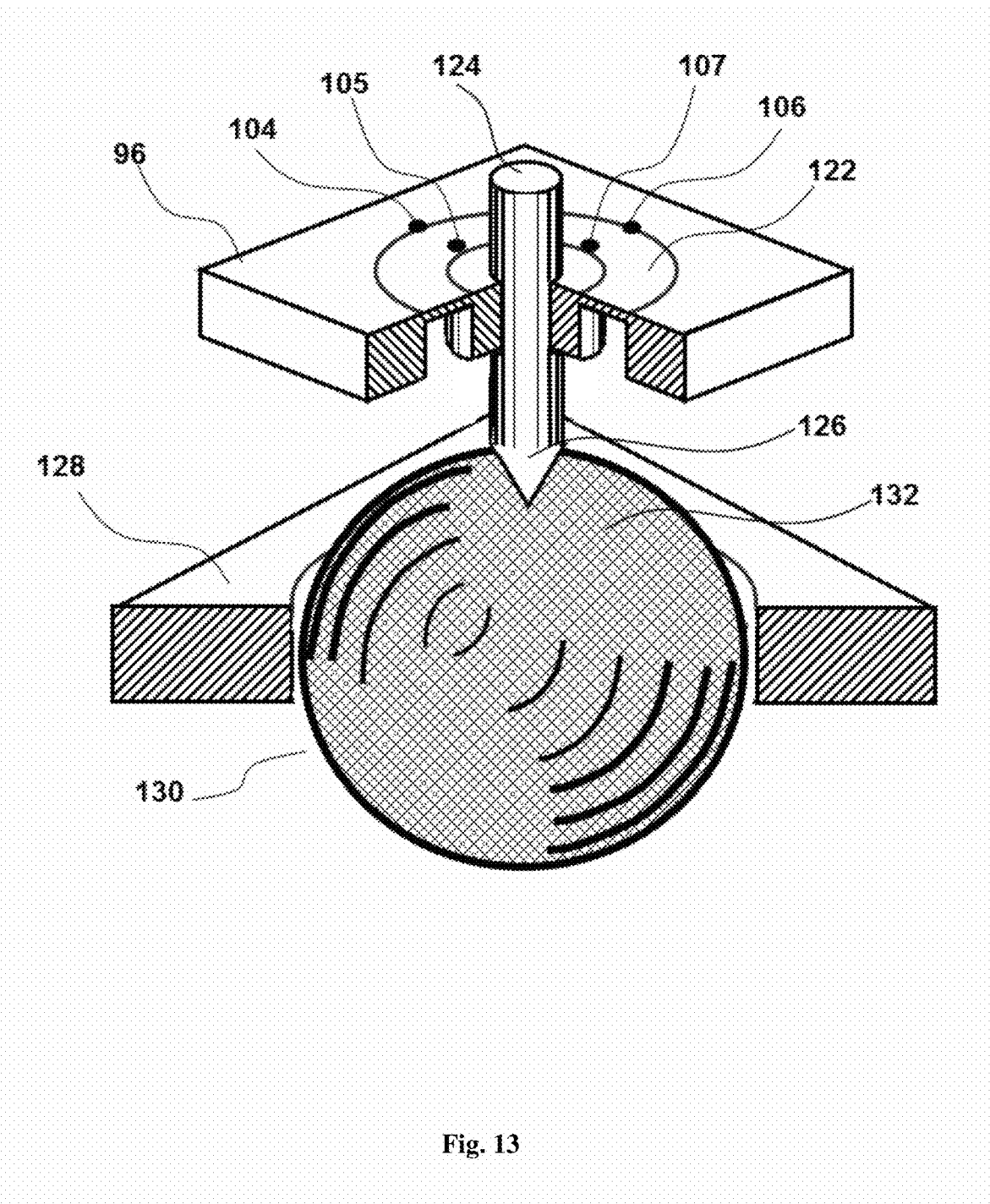
FIG. 13 shows how a tracking ball can be connected to a 3-axis force sensor through an intermediate needle.
Figure 14:
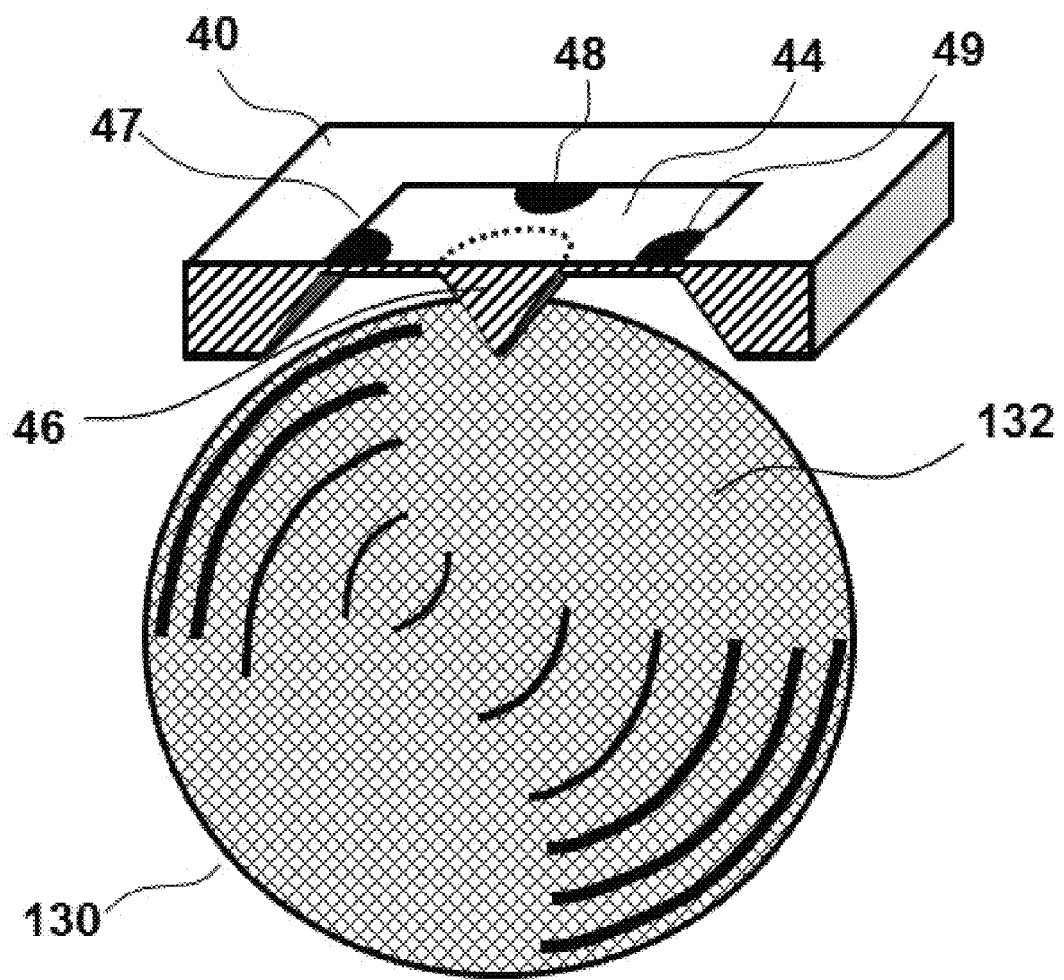
FIG. 14 shows how a tracking ball can be connected to a 3-axis force sensor directly.

Inkless version of an end-point 130 with the ball 132 is presented in FIG. 13. The needle 124 with the sharp point 126 is coupled with the force sensor die 96. When device is moved in different directions on the paper, the ball 132 is rotated and it applies the vector force to the point 126. Measuring the vector force components with the output signals from stress sensitive components 104-107 it is possible to reproduce trajectory of the ball on the paper or other surface similar to how it is done for the conventional mouse. FIG. 14 illustrates a similar approach only without intermediate needle between the sensor die 40 and the ball 132.

Figure 15:
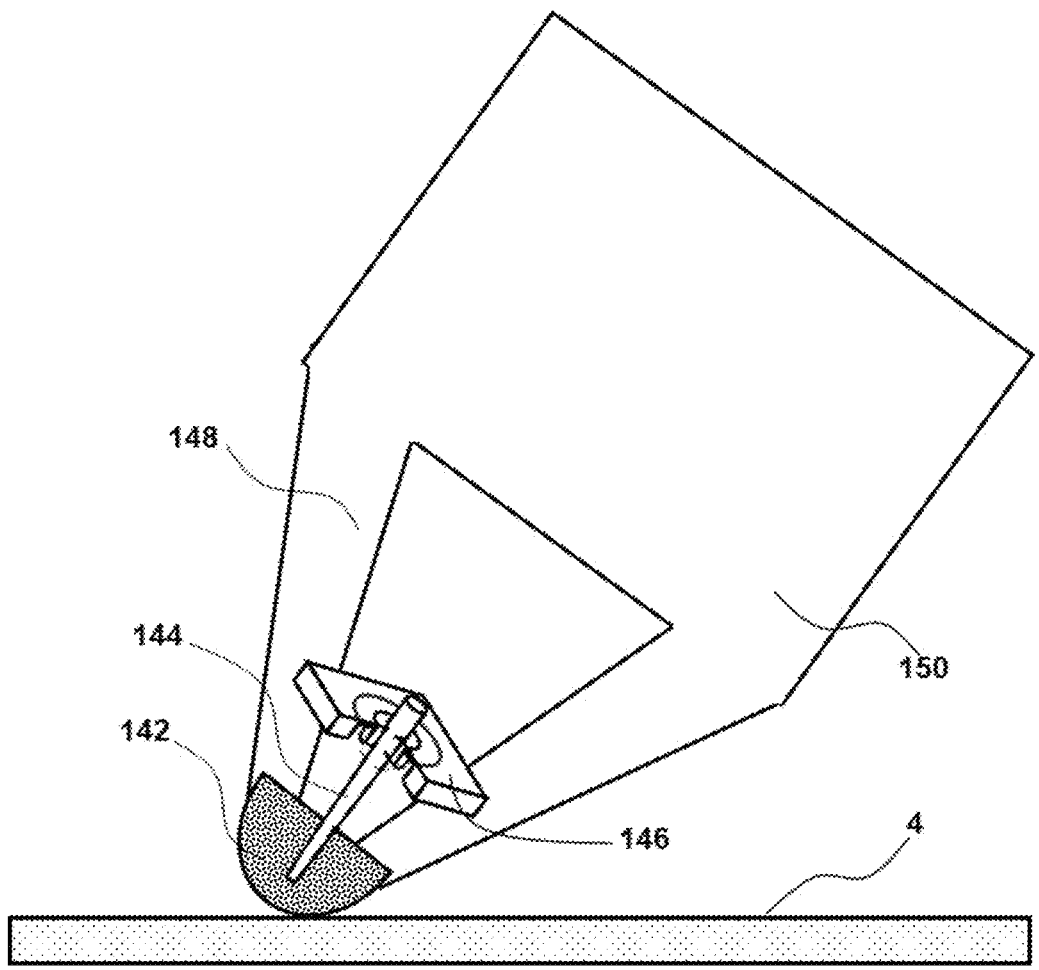
FIG. 15 shows how an end point can be connected to a 3-axis force sensor die within a cartridge of a digital pen or brush.
Figure 16:
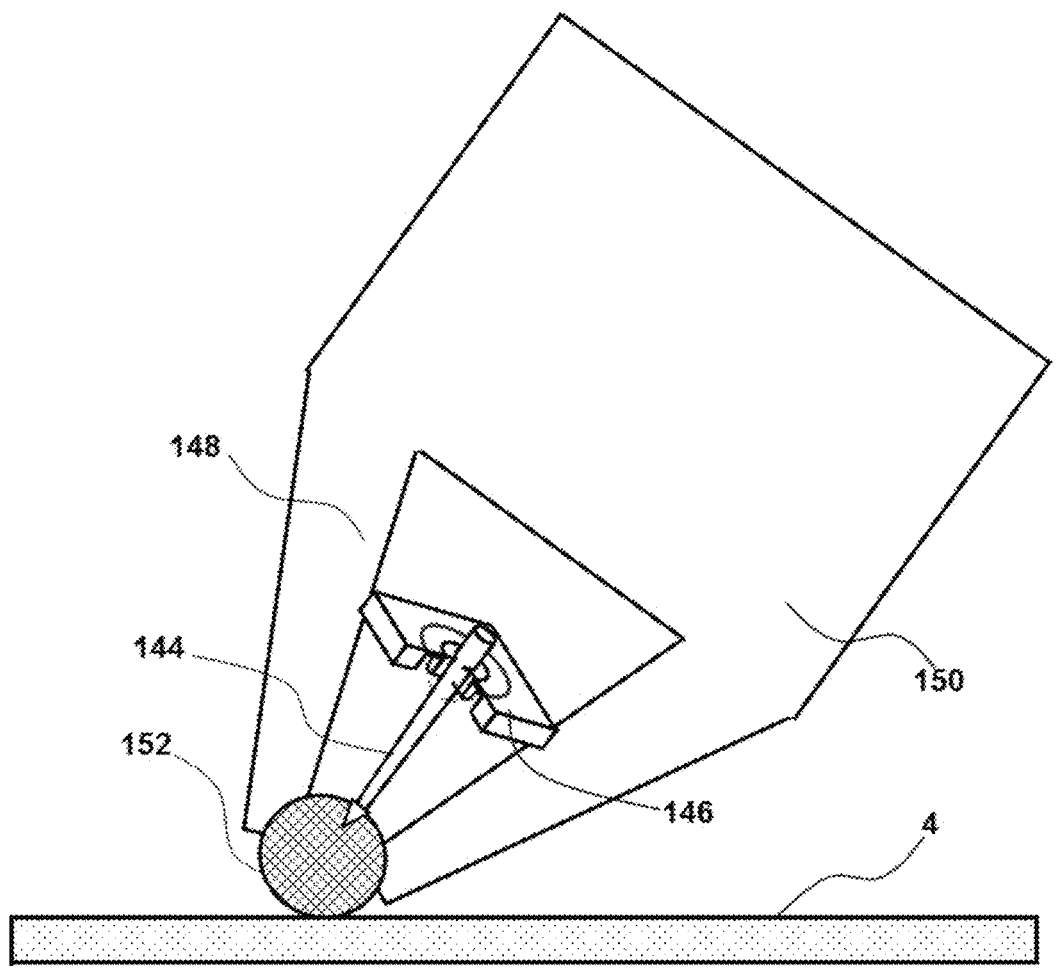
FIG. 16 shows how a tracking ball can be connected to a 3-axis force sensor die within a cartridge of a digital pen or brush.

FIGS. 15 and 16 illustrate how different types of end-points are coupled with the force sensor die within the interchangeable cartridge 150. These two examples are inkless cartridges. In FIG. 15 the end-point is a tip 142 coupled through an intermediate force transferring element 144 to the force sensor die 146. In FIG. 16 the end-point is a ball 152, which is coupled through an intermediate force transferring element 144 to the force sensor die 146.

Figure 17:
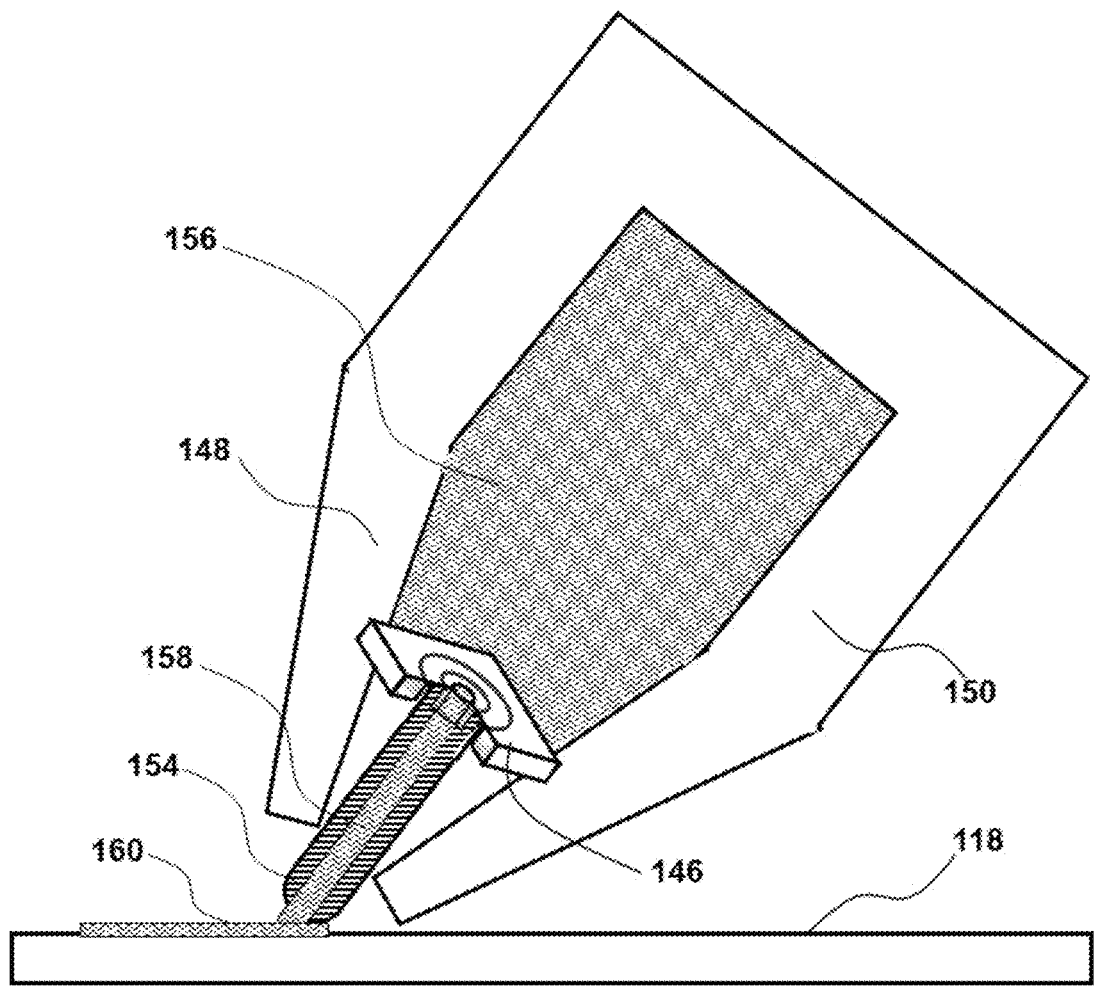
FIG. 17 shows how a capillary needle with ink supply can be connected to a 3-axis force sensor die within a cartridge of a digital pen or brush.
Figure 18:
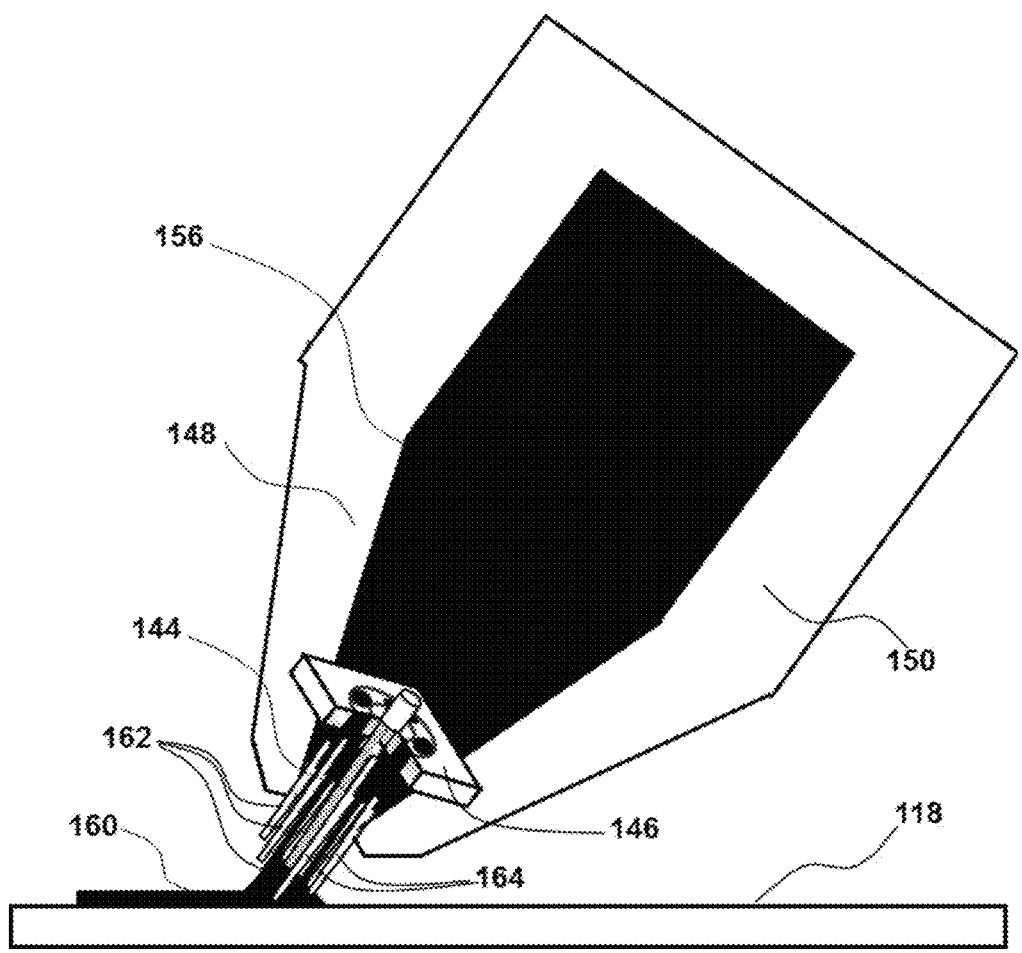
FIG. 18 shows how a bunch of fibers with ink supply can be connected to a 3-axis force sensor die within a cartridge of a digital pen or brush.

FIGS. 17 and 18 illustrate how different types of end-points are coupled with the force sensor die within the ink containing interchangeable cartridge 150. In FIG. 17 the end-point is a pipe 154 coupled to the force sensor die 146. The ink from the ink cartridge 156 is coming through capillary 158 to the surface 160 of the paper 118. In FIG. 18 the end-point is a bunch of fibers 162, 164, which is coupled to the force sensor die 146 with help of either one or several fibers or with intermediate force transferring element 144. The ink from the ink cartridge 156 is coming through capillaries between the fibers 162, 164 to the surface 160 of the paper 118.

Figure 19:
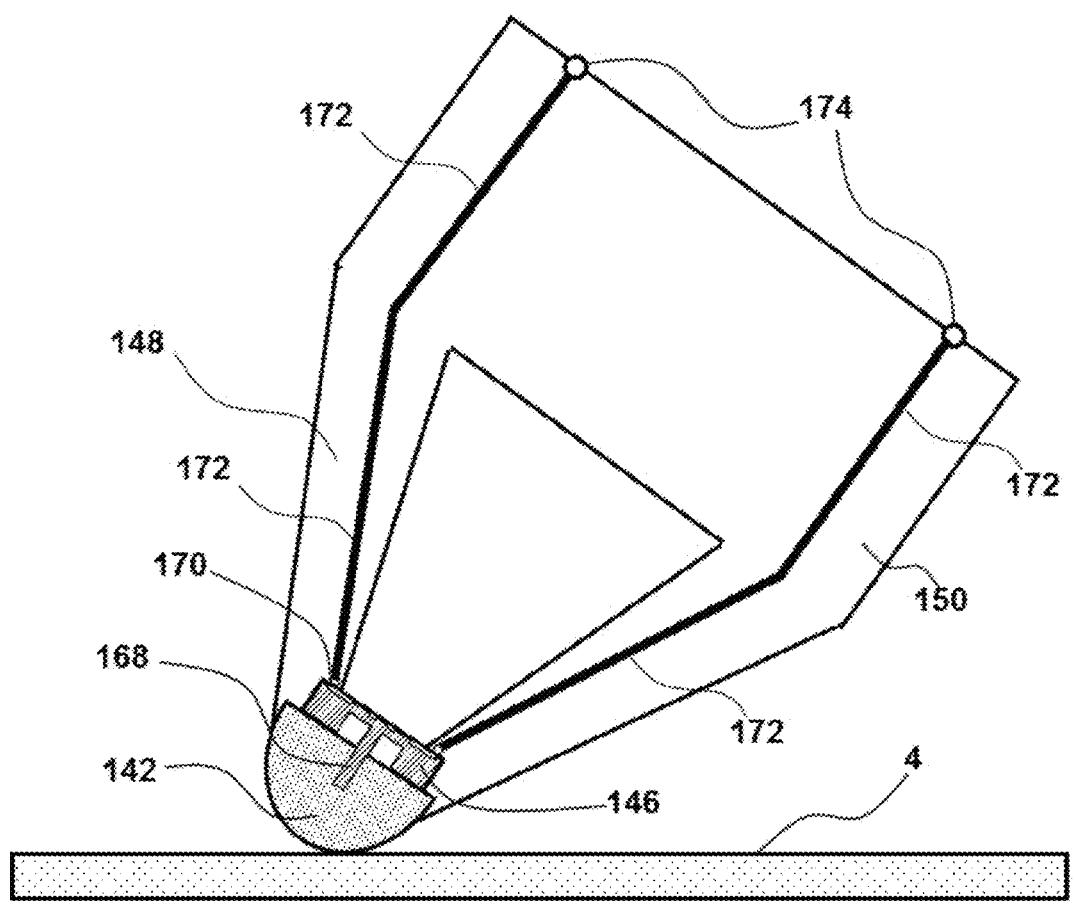
FIG. 19 shows how an end point can be connected directly to a 3-axis force sensor die and how a die can be electrically connected to the outer contacts within an interchangeable cartridge of a digital pen or brush.

FIG. 19 illustrates an example of the interchangeable head 150 of the painting tool. The head comprises an end-point 142 fixed in the conical part 148 of the body of the head 150. The force sensor die 146 is attached to the end-point by the force-transferring element 168. The contact pads 170 of the die 146 are electrically connected by the wires 172 with the external electrical contacts 174, which provide electrical connection of the force sensor with the main processing electronic circuit located within non-interchangeable part of the painting tool.

Figure 20:
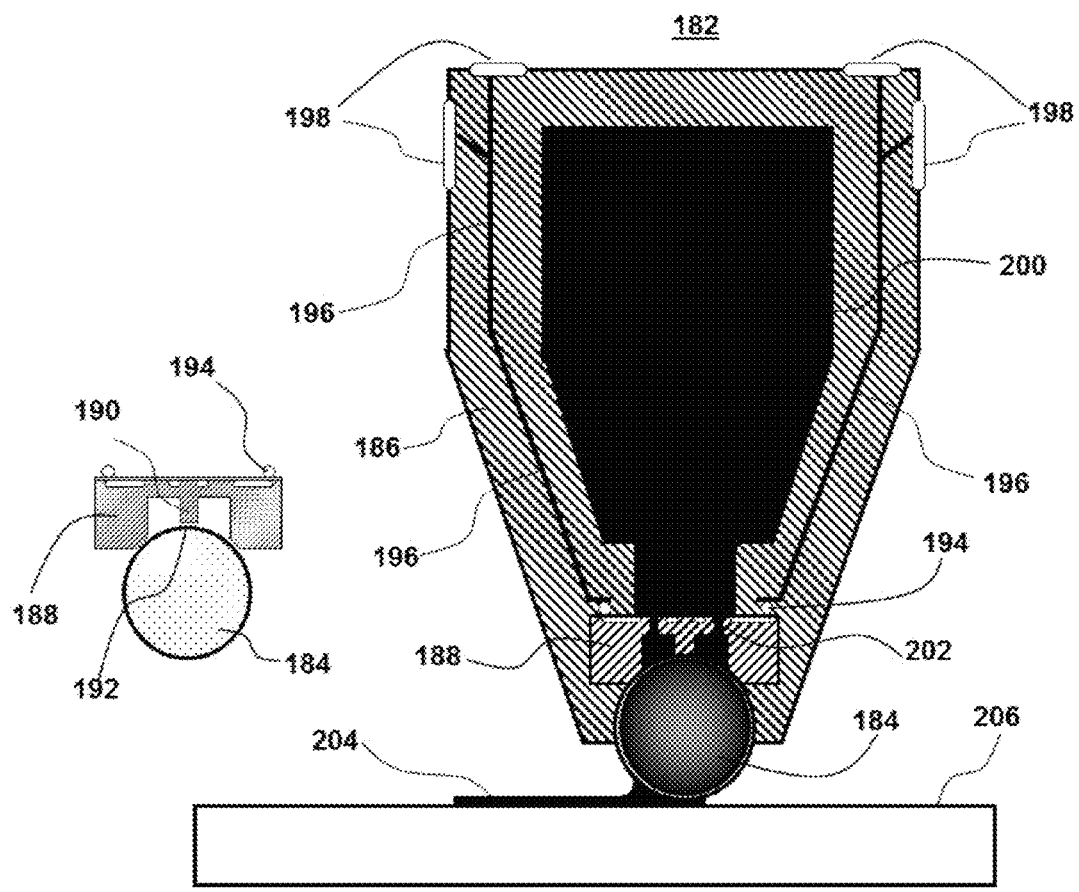
FIG. 20 shows an interchangeable cartridge with a one-layer 3-axis force sensor.
Figure 21:
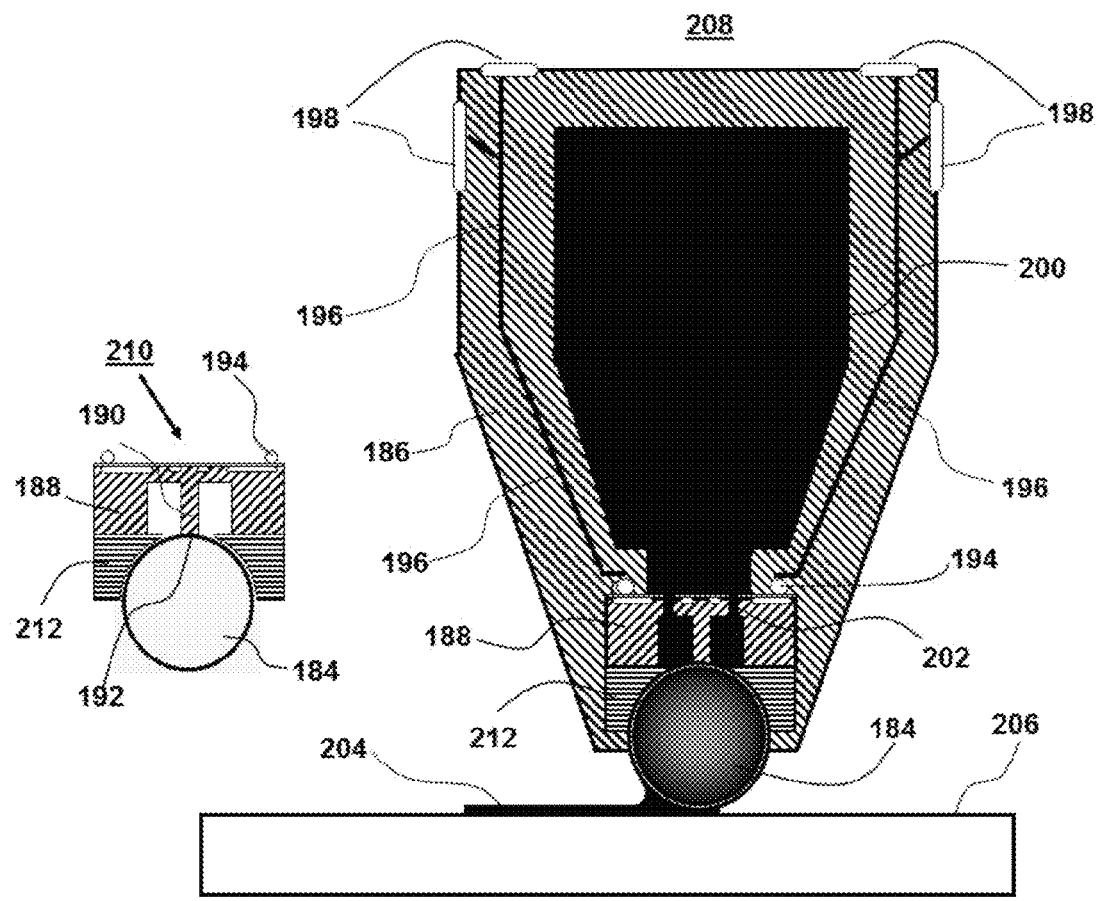
FIG. 21 shows an interchangeable cartridge with a two-layer 3-axis force sensor.
Figure 22:
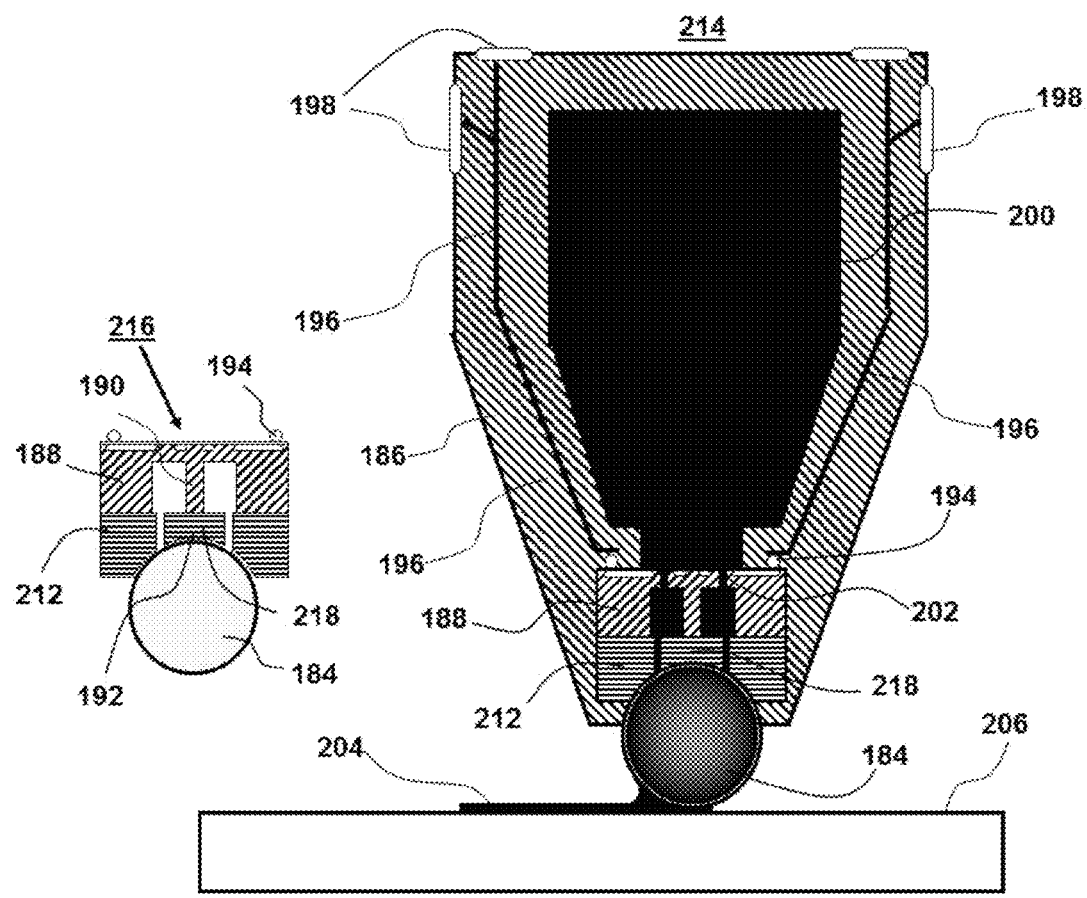
FIG. 22 shows an interchangeable cartridge with a two-layer 3-axis force sensor and increased area of contact between a ball and a force-transferring element.

FIGS. 20, 21 and 22 represent slightly different versions of the ink supplying cartridges 182, 208 and 214 respectively. All cartridges comprise a ball 184, as an end-point. The ball is located in the conical part 186 of the cartridge body. The ball 184 contacts the force perceiving part 190 of the force sensor die 188. In the last case, shown in FIG. 21, it contacts with the force transferring element 218 of the additional die 212 of the sensor die 188. The ink is coming through the openings 202 in the sensor die to the gap 192 between the sensor die and the ball 184. When device is moving along the surface of the paper 206, the ball 184 is rotating, providing ink to the surface of the paper and leaves the trace 204 on the paper 206. While rotating the ball providing a friction force to force perceiving part 190, 218 of the sensor die 188. Depending on the direction of rotation and on pressure applied to the ball the force sensor will be giving different output signals, which allow to digitally record all three force vector components.

The contact pads 194 of the sensor die 188 are connected by wires 196 to the external contact pads 198 providing electrical connection of the interchangeable cartridge comprising sensor with the non-interchangeable signal processing circuits within the body of the entire device.

Figure 23:
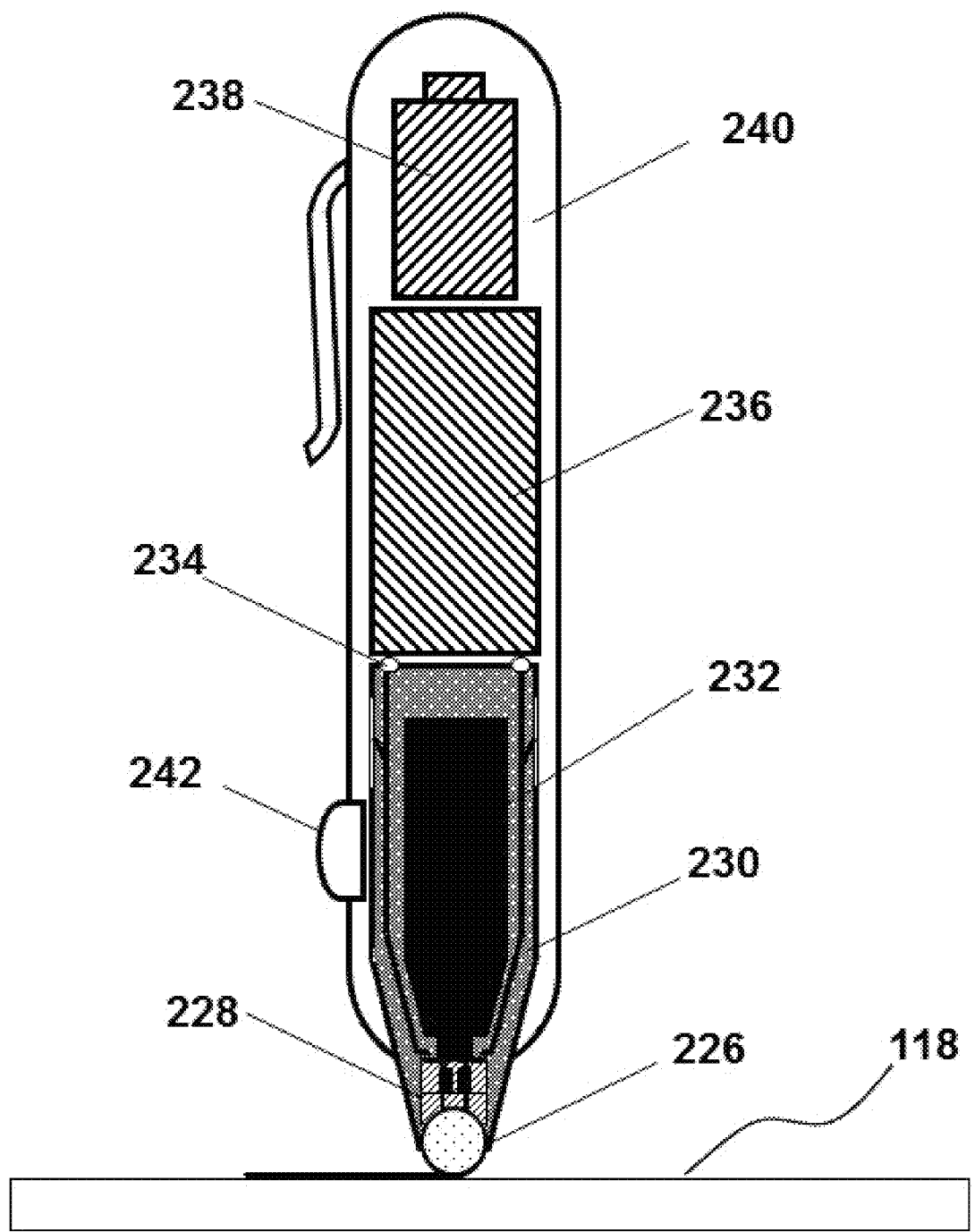
FIG. 23 shows a schematic assembly of an ink-ball digital pen and its major components.

FIG. 23 illustrates an example of an input device with an ink-ball digital pen and its major components. Input device comprises a ball 226, as an end-point. Ball 226 is coupled to a force sensor die 228. All together are integrated within an ink cartridge 230 with an ink capacity 232. Cartridge 230 is connected to a processing block 236 by the electrical contacts 234. Power supply 238 provides electrical power for entire input device system. One or several control buttons 242 provide an ability to control several parameters of the process of painting, drawing, writing or objects navigating on the display during the corresponding process. All the blocks of the input device are integrated within a body 240 of the device.

Figure 24:
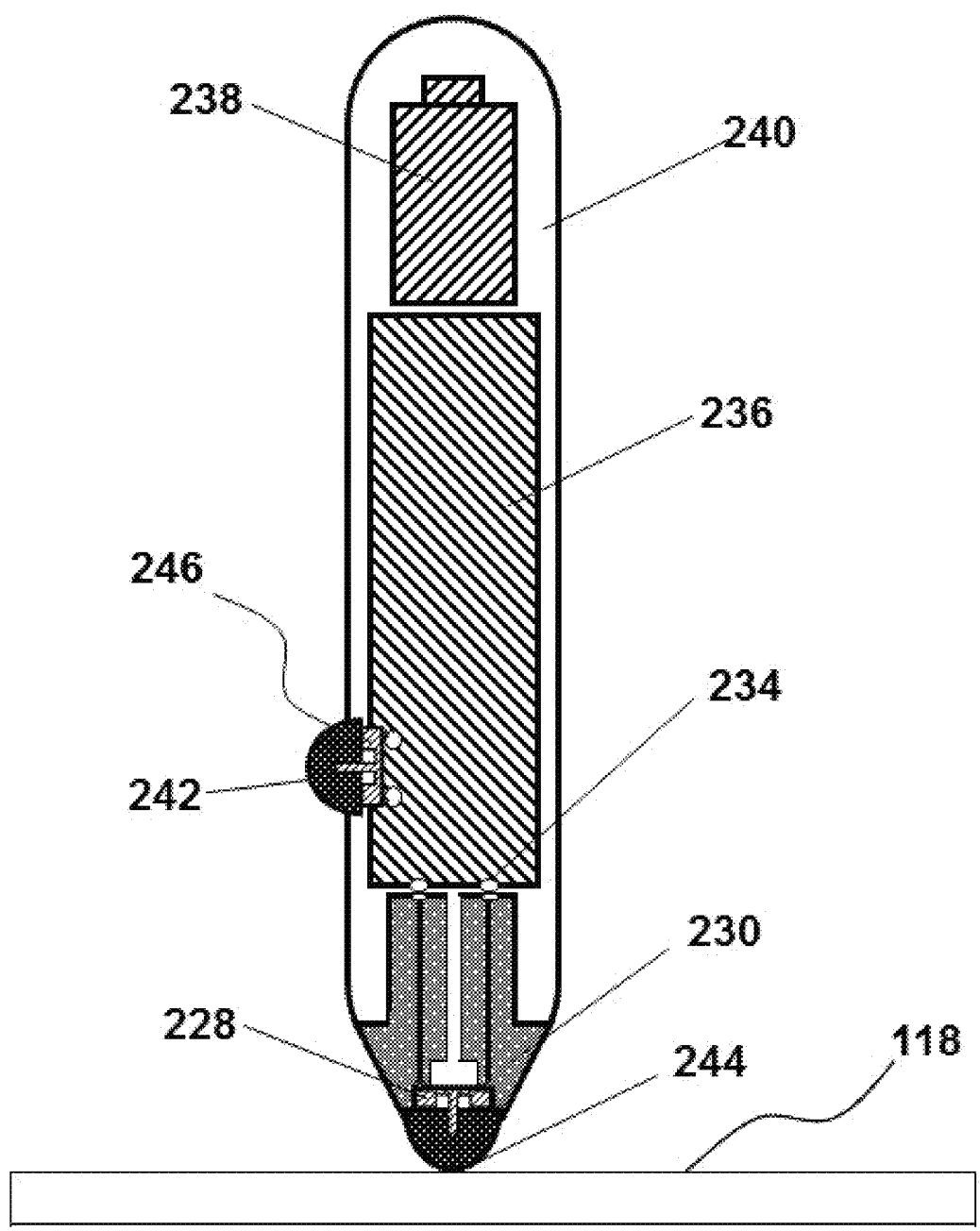
FIG. 24 shows a schematic assembly of an inkless end-point digital brush and its major components.

FIG. 24 illustrates an example of an inkless input device and its major components. An interchangeable cartridge 230 comprises an end-point 224 coupled to a force sensor 228. There is no ink in this version, which could be preferable for painting because it requires variety of colors, stroke sizes, control of the sharpness of line edges and doesn't require the feedback of the ink-drawn lines to control the painting rather than drawing process.

Figure 25:
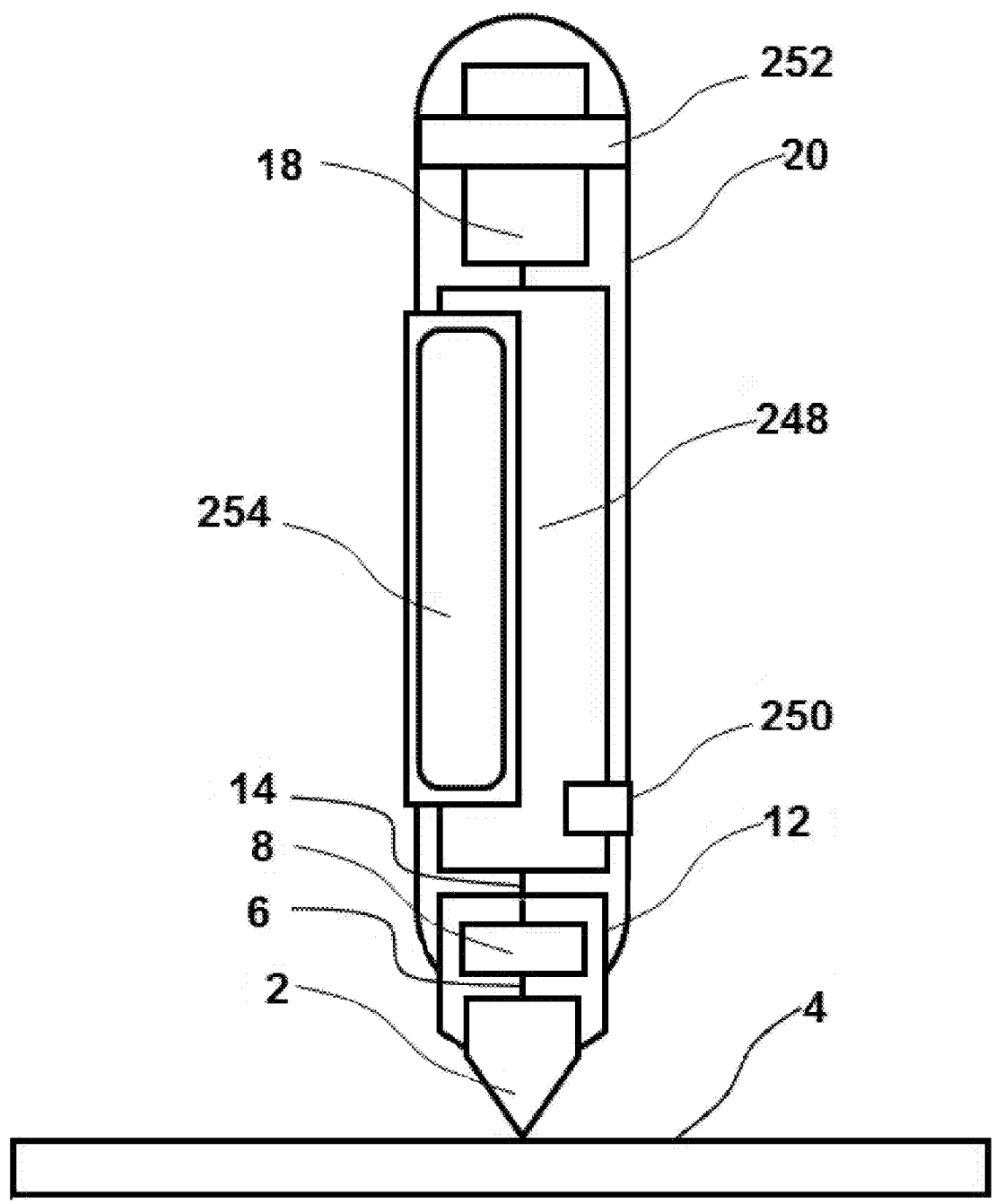
FIG. 25 shows a concept of a cell phone on a platform of a digital pen and brush.

Some enhancement of the processing and wireless communication capabilities of the input device could lead to radical enlargement of the capabilities and applications of the device. FIG. 25 illustrates the device, which, besides its capability to be an input control device, can provide a capability to be used as a simple cell-phone device. Adding simple display 254, microphone 250 and speakerphone 252 can provide cell-phone capability with a new type of input—writing or drawing graphical images, as commands instead of a keyboard. One doesn't need to have a paper or pad. He/she can write text, commands or graphical images on any surface he/she has currently available.

Figure 26:
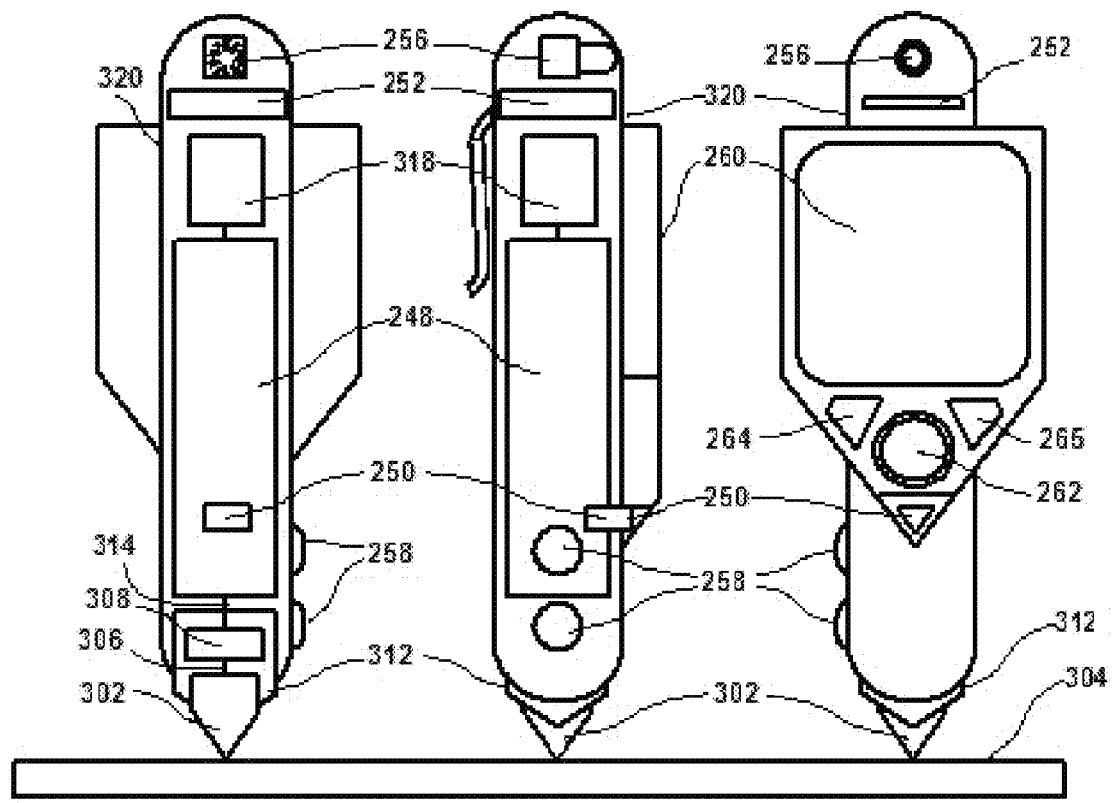
FIG. 26 shows a concept of a smart phone combining a digital pen and brush as universal input control device.

Further enhancements of capabilities such a device might lead to a new generation of the smart phone devices, which have almost all the capabilities of the current smart phones plus new features like graphic input control and more precise gaming control on the mobile devices. FIG. 26 illustrates an example of universal mobile device, which can be used for multiple applications. It can be used as a painting or drawing tool, as a pen or pencil for writing, as a mouse or joystick for navigation on the screen of computer or mobile gaming. It can have a wireless capability and can be combined with the cell-phone capabilities with all the attributes, which smart phone has: display, camera, microphone, speakerphone, control buttons, etc.

As follows from FIG. 26, which depicts the front, side and back projections of the device, it has an end-point 302 coupled to the multi-axis force sensor 308 within an interchangeable cartridge 312. The tool has an electronic block 248, which comprise digital processor, wireless communication circuits, additional sensors, etc. For example, microphone 250 can be part of the block 248. Inside the body 320 of the device a power supply 318, speakerphone 252 and photo-camera 256 can also be located. A part of the body 320 is a display 260. A number of control buttons 258, 262, 264, 265 can be situated in convenient locations on the body 320 of the tool. Different functions, as described above, can be assigned to these control buttons. Each of these buttons can be multi-axis micro-joysticks significantly increasing the total number of functions under control.

Figure 27:
FIG. 27 shows a picture of a new concept of a smart phone.

FIGS. 27-30 illustrate several versions of the smart cell-phones, which can be design and created on the basis of presented invention. FIG. 27 presents a version with smart pen, pencil, brush, joystick, mouse and universal remote control device convenient for holding in the wrist and still having a display, a microphone and a speakerphone.

Figure 28:
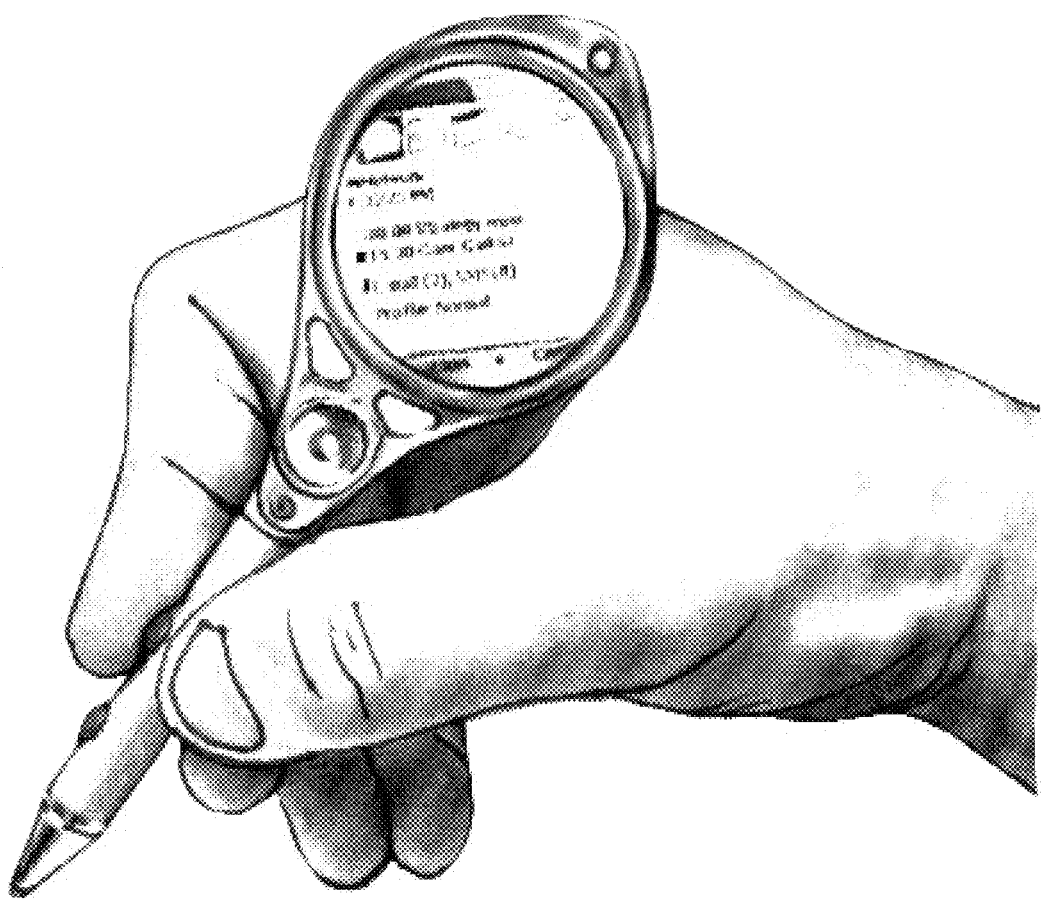
FIG. 28 shows a picture of a new concept of a smart phone with round screen, which can be automatically rotated controlled by a tilt sensor.

FIG. 28 presents a similar version of the universal tool having a circular display, the angular position of the image on which can and adjusted depending on the angle of the tool with respect to the writing plane based of the output of a tilt sensor within the input device.

Figure 29:
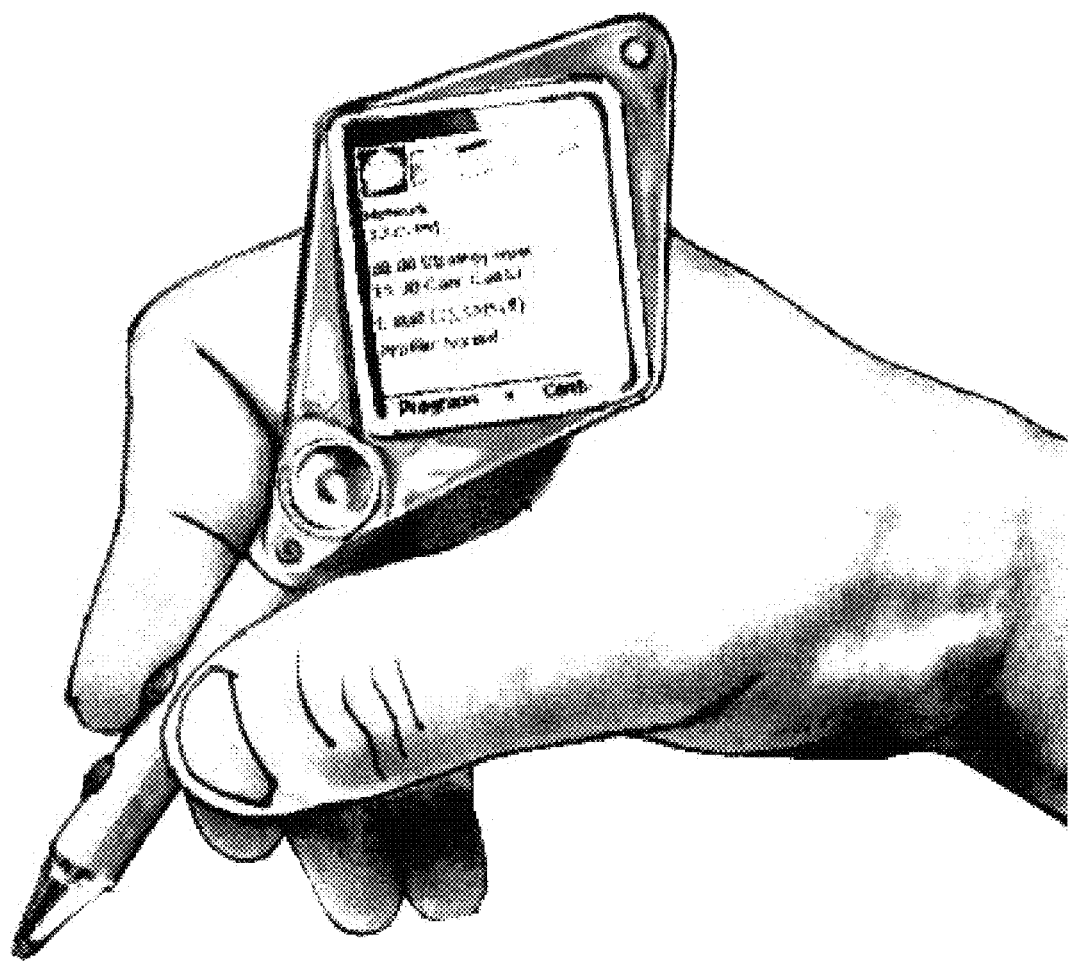
FIG. 29 shows a picture of a new concept of a smart phone with a diamond shape head and convenient diagonal position of the screen.

FIG. 29 presents a similar version of the universal tool having a diamond shape of the handle for the display and diagonal position of the display for more convenient observation of the display in the process of writing, texting, surfing, reading, etc. In case of painting this display could serve as a color pallet and other functions and feature's pallet.

Figure 30:
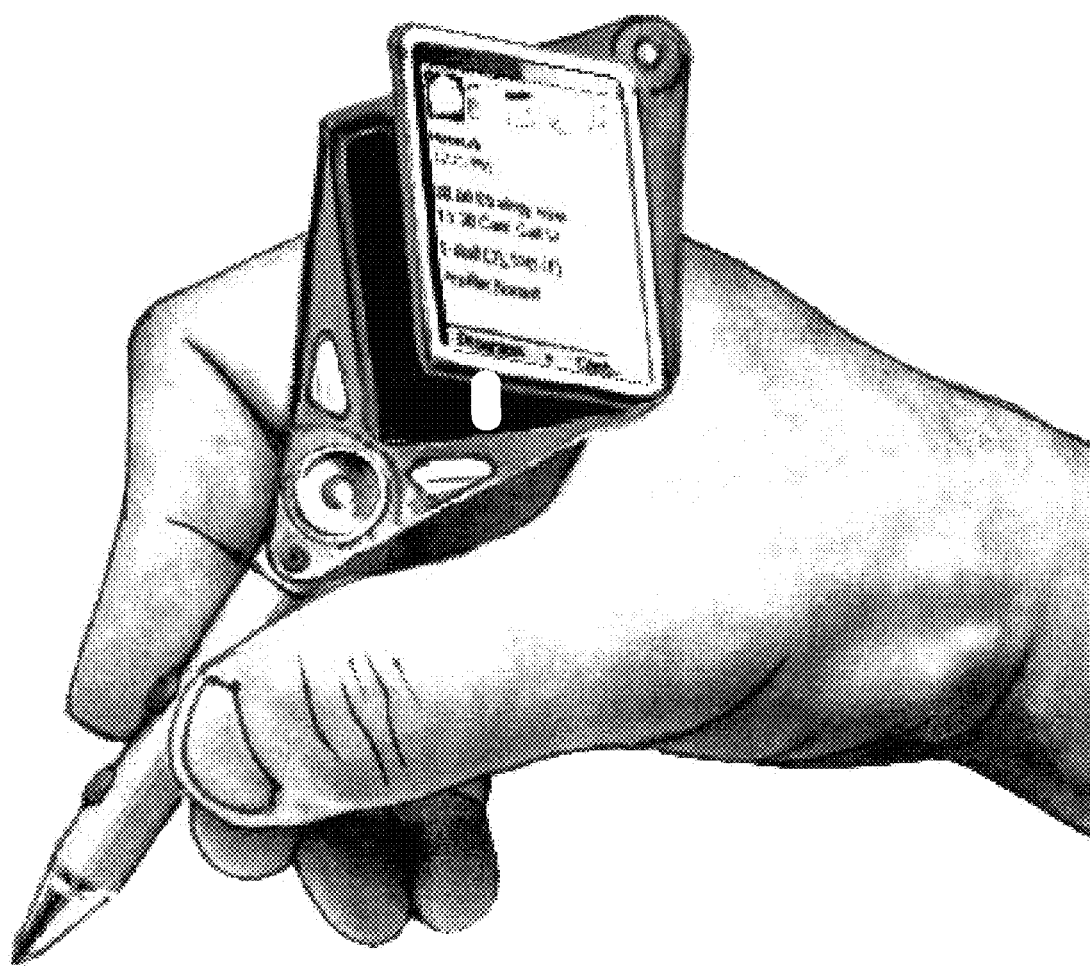
FIG. 30 shows a picture of a new concept of a smart phone with flipping screen.

FIG. 30 presents another version of the universal tool having a flipping display, which might even better adjust the position of the display with respect to the user while he is writing, drawing, painting or navigating cursor on the display.

The system for recording hand-painted, hand-drawn and handwritten information defined by a hand and/or fingers movement described above can also comprise the following elements:

an end-point as a tip coupled to the at least one at least one-axis force sensor;
a tip, which has at least one channel inside for supplying an ink to the writing surface;
a tip, which is made from a material chosen from a group of materials consisting of: plastic, metal, ceramic, glass, nano-materials, or combination;
a tip, which has a flexible portion connecting it with the force sensor providing the adequate transfer of the displacement of the tip and force applied to the tip to the force sensor and preventing the mechanical overload of the sensor;
an end-point as a ball sitting in a housing allowing rotation of the ball and contacting with to the at least one at least one-axis force sensor;
a ball, which is made from a material chosen from a group of materials consisting of: metal, plastic, ceramic, glass, nanomaterials, or combination.
a housing for the ball, which has stops limiting the force, with which the ball can press the force sensor, providing mechanical overload protection of the sensor;
a gap between the ball and the housing, which provides a channel for supplying an ink to the writing surface;
an end-point as a bunch of fibers coupled to the at least one at least two-axis force sensor;
a bunch of fibers is made from a material chosen from a group of materials consisting of: metal, plastic, ceramic, glass, nano-fibers, nanowires, nano-materials or combination.
a bunch of fibers, which provides channels between the fibers for supplying an ink to the writing surface;
a bunch of fibers, which is coupled with the force sensor by at least one fiber, providing the adequate transfer of the force applied to the tip of the pin to the force sensor and preventing the mechanical overload of the sensor;
filtering means, which allow to distinguish at least in part the presence of vibrations of the end-point, as a result of the movement, measured by at least two-axis force sensor;
a memory, wherein the handwritten information is stored in character-coded digital format;
a display for presenting the handwritten information based on said stored character-coded digital format;
means for indicating on the surface the movement of the device;
means for said digitizing information and processing the data related to the change of the force vector components in parallel with said description in digital format;
an interchangeable end-point of the device, which comprises at least one sensor;
a cartridge, which is interchangeable;
a cartridge, which comprises the end-point;
a cartridge, which comprises at least one at least two-axis force sensor.
a cartridge, which comprises electrical contacts for providing power to the force sensor and transferring information from the sensor to the digital processing system within the body of the input device;
at least one at least one-axis accelerometer within the input device and determining whether the device has been moved over the surface or not based at least in part on the presence of vibrations measured by the accelerometer;
at least one at least two-axis accelerometer within the input device and determining, on the basis of measurement of acceleration vector, the speed at which the device has been moved in X and Y directions between recording of two positions on the writing surface;
at least one three-axis accelerometer within the input device and determining, on the basis of measurement of acceleration vector, the speed, at which the device has been moved between recording of two positions on the writing surface and the tilt of the pen relative to the vector of gravity;

at least one-axis angular rate sensor (gyro) within the device and determining the angular rate, at which the device has been moved between recording of two positions on the writing surface;

an angular rate sensor (gyro), which is a two-axis angular rate sensor (gyro);

an angular rate sensor (gyro), which is a three-axis angular rate sensor (gyro);

hardware and software means for comparing at least one of the characteristics chosen from the group consisting of: graphical image data, corresponding speed data, acceleration data, angular rate data, angular acceleration data, angular orientation data with pre-recorded graphical image, corresponding speed, acceleration, angular rate, angular acceleration and angular orientation images data for multilevel verification of authenticity of the handwritten information;

a sensor die, where the semiconductor substrate is made from material chosen from the group consisting of: elements from the IV group of the Periodic Table, silicon, germanium, silicon carbide, diamond like carbon, elements from III and V groups of the Periodic Table, gallium arsenide, gallium nitride, indium phosphide;

a sensor die, where the elastic element in the semiconductor substrate has thickness and a shape of ring or n-sided faceted geometry;

a sensor die, wherein the elastic element has uniform thickness of less than the substrate and the rigid island element center as the axis of symmetry;

a sensor die, wherein the elastic element has non-uniform thickness of less than the thickness of the substrate;

a sensor die, wherein an elastic element has at least one through opening in its thickness dimension;

a sensor die, wherein at least one stress concentrating element is located on the elastic element and having the shape from a group of shapes consisting of: V-groove, trapezoidal groove, and a groove with the sidewalls forming an angle in the range of 90 degree+/−5 degree with the surface of the diaphragm;

a sensor die, comprising rigid island element of shape from a group of shapes consisting of: cone, cylinder, semi-sphere, sphere, faceted cone, faceted cylinder, faceted semi-sphere, faceted sphere and combinations of these;

a sensor die, comprising a rigid island element with at least one non-uniformity from a group of non-uniformities consisting of: cavity, hole, mesa, bridge, cantilever, and combinations of these;

a sensor die, comprising a rigid force-transferring element having a shape chosen from a group of shapes consisting of: ring, plate, disk, beam, inverted mushroom, or cone, and force-transferring element surface, coupling the force-transferring element and the end-point through constructs from a group of constructs consisting of a negative slope, cavity, hole, groove, mesa, pin, bridge, cantilever and combination a sensor die, comprising an intermediate adhesive layer coupling the rigid force-transferring element and rigid island element, adhesive is chosen from a group of adhesive consisting of: a polymer, a solder, a frit-glass, a negative photoresist, and a polyimide based compound;

a sensor die, comprising a rigid force-transferring element of the material chosen from the group of materials: silicon, semiconductor material, metal, alloy, plastic, glass, and ceramic;

a sensor die, comprising a spring element chosen from the group of spring elements consisting of: spring, thin beam, wire, elastic plastic button, elastic plastic stick, elastic plastic rocking button, spine-like structure, elastic dome with mechanical feedback, plastic shell filled in with liquid, plastic shell filled in with gel, and elastomeric button;

a sensor die, comprising an electronic circuit which provides functions from a group of functions consisting of: analog amplifying, analog multiplexing, analog-to-digital conversion, signal processing, memory for compensation coefficients, digital interface, power management, transmitting and receiving radio-signals, and management of charging from piezoelectric elements;

a sensor die, comprising a wireless communication means and a power supply;

a sensor die, comprising: integrated wireless communication means; at least one piezoelectric element for generating electrical power from mechanical force applied to the end-point, and at least one capacitor for storing piezoelectric generated power;

additional controls in the additional input control device, which are mounted on a body of the device and individual controls for different fingers are chosen from the group: finger-mouse, finger-joystick, one-axis finger force sensor, two-axis finger force sensor, three-axis finger force sensor, tactile sensors, or combination;

additional controls in the additional input control device, which are mounted on individual fingers in the form of a ring or a thimble and these individual additional input controls comprise sensors chosen from the group: one-axis, two-axis, or three-axis finger force sensor, tactile sensors, one-axis, two-axis, or three-axis accelerometer, one-axis, two-axis, or three-axis angular rate sensor (gyro), or combination;

individual additional input control devices, which comprise at least one of: at least one electronic circuit for processing output signals from the sensors, wireless communication means, power supply.

The method of recording hand-painted, hand-drawn and handwritten information defined by a hand and/or fingers movement described above can also possess the following properties:

providing a description in digital format, which control functions are linked to individual vector force components;

providing such control functions to be linked to individual vector force components of the input device, which are chosen from the list of functions consisting of: action, turning on and off, navigation of a cursor on the display of the electronic device, scrolling, zooming, shadowing, screening, selecting, deleting, restoring, saving, opening, closing, searching, setting up, previewing, undoing, clearing, repeating, pasting, finding, replacing, inserting, formatting, color selection, color mixing, line or stroke width, brush size, swatch size, sponge size, eraser size or combination;

providing at least one button each coupled with at least one at least one-axis force sensor for inputting an additional control signals into a digital processing system of the device;

providing additional control signals, which are linked to the functions chosen from the list of functions consisting of: action, turning on and off, navigation of a cursor on the display of the electronic device, scrolling, zooming, shadowing, screening, selecting, deleting, restoring, saving, opening, closing, searching, setting up, previewing, undoing, clearing, repeating, pasting, finding, replacing, inserting, formatting, color selection, color mixing, line or stroke width, brush size, swatch size, smudge tool size, sharpen tool size, blur tool size, dodge tool size, burn tool size, sponge tool size, eraser size . . . or combination;

providing a button coupled to the valve controlling the flow of ink to the end-point of the device;

providing an additional input control device, which has chosen from the group of devices: mouse, joystick, touch-pad, finger-mouse, finger-joystick, scroll-wheel, pen-mouse, pen-pads, based on motion sensors, based on sound, based on voice recognition, touch-screen, key-board, tactile sensors, based on changing electro-static field by a hand, based on changing electromagnetic field by a hand, based on changing light intensity by a hand or combination;

providing an additional input control device, which has at least two independent controlling inputs, which can be controlled by different fingers;

providing a description in digital format of which control functions are linked to which inputs of the additional input control device;

providing control functions to be linked to the additional input control device, which are chosen from the list of functions consisting of: action, turning on and off, navigation of a cursor on the display of the electronic device, scrolling, zooming, shadowing, screening, selecting, deleting, restoring, saving, opening, closing, searching, setting up, previewing, undoing, clearing, repeating, pasting, finding, replacing, inserting, formatting, color selection, color mixing, line or stroke width, brush size, swatch size, sponge size, eraser size or combination;

providing an additional input control device, which can be controlled by the other hand and/or fingers relative to the ones involved into moving of the hand-painting, hand-drawing and handwriting input device.

It should be understood that the method and system for digital recording of hand-painted, hand-drawn and handwritten information and navigating a cursor on the display defined by a hand and/or fingers movement, the input control device, the additional input control devices, the microstructure of the sensors used in the input devices and other details do not limit the present invention, but only illustrate some of the various technical solutions covered by this invention. While the invention has been described in detail with reference to preferred embodiments, it is understood that variations and modifications thereof may be made without departing from the true spirit and scope of the invention.

Therefore, while the invention has been described with respect to a limited number of the embodiments, those skilled in the art, having benefits of this invention, will appreciate that other embodiments can be devised, which do not depart from the scope of the invention as disclosed herein. Other aspects of the invention will be apparent from the following description and the appended claims.

What is claimed is:

1. A method of digital recording of hand-painted, hand-drawn and handwritten information and navigating a cursor on the display defined by a hand and/or fingers movement, said method comprising:
   providing a computing device with a display;
   providing an input device comprising: an interchangeable end-point; a single force vector sensor integrated on a semiconductor substrate chip, wherein the semiconductor substrate chip is included in the interchangeable end-point;
   providing any working surface suitable for moving the input device comprising the interchangeable end-point across the working surface in a process of painting, drawing, writing or cursor navigating;
   moving the input device with a hand and/or fingers such that the interchangeable end-point is contacting the working surface during the hand and/or fingers movement relative to the surface while recording with the single force vector sensor the change of a vector of force applied to the sensor by the end-point;
   digitizing this information and processing the data related to the change of the force vector components;
   providing a description in digital format of how the input device has been pressed to the working surface based at least in part on the force applied by the end-point to the working surface; and
   providing a description in digital format of how the input device has been moved over the working surface based at least in part on the correlation between the force vector components and corresponding movement vector components.

2. The method according to claim 1, further providing a description in digital format of whether the input device has been moved over the working surface or not based at least in part on the presence of vibrations of the end-point, as a result of the movement, measured by the single force vector sensor.

3. The method according to claim 1, further providing displaying the hand-painted, hand-drawn and handwritten information and the cursor navigating information based on said description and using this displaying for different purposes including using it as a visual feedback in the process of painting, hand-drawing, handwriting and cursor navigating.

4. The method according to claim 1, wherein the handwritten information comprises characters and further comprising identifying the characters with the aid of the description and storing them in character-coded digital format and further comprising displaying the handwritten information based on said description.

5. The method according to claim 1, further comprising providing an ink within the input device to generate permanent marks on the working surface while the end-point is contacting the working surface during the hand movement relative to the surface, wherein the ink flows directly through the semiconductor substrate chip.

6. The method according to claim 1, further comprising:
   providing an at least two-axis motion sensor within the input device;
   moving the input device with a hand and/or fingers such that the end-point is contacting the working surface during the hand and/or fingers movement relative to the surface while recording with the at least two-axis motion sensor the change of the vector of movement and recording with the integrated single force vector sensor the change of the vector of force applied to the force sensor by the end-point;
   digitizing this information and processing the data related to the change of the movement vector components and force vector components;
   providing a description in digital format of how the input device has been moved and pressed to the surface based at least in part on the movement sensor components and force applied by the end-point to the working surface.

7. The method according to claim 6, further comprising a step of comparing at least one of the characteristics chosen from the group consisting of: graphical image data, corresponding speed data, acceleration data, angular rate data, angular acceleration data, angular orientation data with pre-recorded graphical image, corresponding speed, acceleration, angular rate, angular acceleration and angular orientation images data for multilevel (checking) determining the authenticity of the handwritten information.

8. The method according to claim 6, further providing an additional inputs control device with at least one button/joystick coupled with corresponding multi-axis sensor, which controls additional functions during movement of the hand-painting, hand-drawing, handwriting and cursor navigating device.

9. The method according to claim 6, wherein the force sensor vector components and motions sensors vector components are associated with different functions required to be inputted into a computer system, where control functions to be linked to individual vector sensors components are chosen from the list of functions consisting of: action, turning on and off, navigation of a cursor on the display of the electronic device, scrolling, zooming, shadowing, screening, selecting, deleting, restoring, saving, opening, closing, searching, setting up, previewing, undoing, clearing, repeating, pasting, finding, replacing, inserting, formatting, color selection, color mixing, line or stroke width, brush size, swatch size, sponge size, eraser size . . . or combination.

10. A system for digital recording of hand-painted, hand-drawn and handwritten information and for navigating a cursor on the display defined by a hand and/or fingers movement, said system comprising:
  a computing device with a display;
  an input device for hand-painting, hand-drawing and handwriting and for navigating a cursor on the display, said device comprising:
  an interchangeable end-point;
  a single force vector sensor integrated on a semiconductor substrate chip, wherein the semiconductor substrate chip is included in the interchangeable end-point;
  IC circuit for digitizing the information from the single force vector sensor and processing the data related to the change of the force vector components;
  hardware and software for providing a description in digital format of how the input device has been pressed to the surface based at least in part on the force applied by the end-point to the writing surface; and
  hardware and software for providing a description in digital format of how the input device has been moved over the surface based at least in part on the correlation between the force vector components and corresponding movement vector components,
  wherein the input device is moving with a hand and/or fingers such that the interchangeable end-point is contacting a surface suitable for such movement across the surface in a process of painting, drawing, writing or cursor navigating while recording with the single force vector sensor integrated on a semiconductor substrate chip the change of the vector force representing the motion of the input device and force applied to the sensor by the interchangeable end-point.

11. The input device according to claim 10, further comprising an overall housing (body) having a shape chosen from a group of shapes consisting of: pen-like shape, pencil-like shape, brush handle-like shape, button-like shape, pill-like shape, thimble-like shape, ring-like shape, cylinder, rod, plate, parallelepiped, ellipsoid, sphere, semi-sphere, torus, cone, prism, or combination.

12. The input device according to claim 10, further comprising a transceiver selectively operating for wireless transferring said description to an external computing device with display.

13. The input device according to claim 10, further comprising an interchangeable cartridge with ink within the input device for generating permanent marks on the surface while the end-point is contacting the surface during the hand movement relative to the surface, wherein the cartridge comprises the single force vector sensor and electrical contacts for providing power to the single force vector sensor and transferring information from the single force vector sensor to the IC circuit for digitizing the information from the single force vector sensor and processing the data related to the change of the force vector components within the body of the input device.

14. The input device according to claim 10, further comprising at least one sensor chosen from the group of sensors consisting of: one-axis linear accelerometer, two-axis linear accelerometer, three-axis linear accelerometer, one-axis gyro, two-axis gyro, three-axis gyro, one-axis angular accelerometer, two-axis angular accelerometer, three-axis angular accelerometer, one-axis compass, two-axis compass, three-axis compass for determining the motion parameters characterizing how the input device has been moved between recording of two positions on the writing surface.

15. The input device according to claim 10, wherein the interchangeable end-point is chosen from the group: a tip or pin coupled to the single force vector sensor; a ball sitting in a housing allowing rotation of the ball and contacting with the single force vector sensor; a bunch of fibers coupled to the single force vector sensor.

16. The input device according to claim 15, wherein the interchangeable end-point comprises at least one of the following features:
  a flexible portion connecting it with the force sensor providing the adequate transfer of a displacement of the end-point and the force applied to the end-point to the force sensor;
  a housing, which has stops limiting the force, with which the end-point can press the force sensor, providing mechanical overload protection of the force sensor;
  at least one channel inside the end-point for supplying an ink to the writing surface.

17. The input device according to claim 10, wherein single force vector sensor comprises: a sensor chip formed within semiconductor substrate chip; an elastic element within said semiconductor substrate chip; a frame formed around said elastic element and coupled with at least part of the periphery of said elastic element all within the semiconductor substrate chip; at least one channel through the sensor chip for an ink supply; at least three mechanical stress sensitive IC components located in the elastic element for providing electrical output signals proportional to the mechanical stress in the location of the IC components; at least one rigid island element formed in the semiconductor substrate chip and coupled with the elastic element; at least one rigid force-transferring element coupled to the rigid island of a sensor chip, which transfers an external vector force to the elastic element and through it to the IC components, which provide electrical output signal; and at least one electronic circuit for processing output signals from the mechanical stress sensitive IC components.

18. The input device of claim 17, further comprising electronic circuits from a group of electronic circuits consisting of amplifiers, multiplexers, analog-to-digital converters, digital-to-analog converters, microprocessor, flash memory, EEPROM, and I/O interface circuits.

19. The input device of claim 17, further comprising at least one stress sensitive IC component chosen from the group of stress sensitive IC components consisting of: a piezoresistor, a pn-junction, a tunnel diode, a Schottky diode, a shear stress component, a piezoresistive Wheatstone bridge, a MOS transistor, a complementary pair of CMOS transistors, a bipolar transistor, a pair of p-n-p and n-p-n bipolar transistors, a bipolar transistor and at least one piezoresistor connected to transistor, a MOS transistor and at least one piezoresistor connected to transistor, a bipolar transistor circuit, and a CMOS transistor circuit.

20. The input device according to claim 10, further comprising hardware and software means for using this input device as a cell phone, said hardware comprises at least: cell phone processor, transceiver, microphone, speakerphone, display, control buttons, photo-camera, video-camera, voice and video recorder, wherein different control functions are inputting into the cell phone via graphical presentation by input device itself and chosen from: phone dialing by writing numbers, phone dialing by writing codes or symbols, phone dialing by writing names, text messaging by writing a message, text messaging by writing a letters, text messaging with personalized graphics, all required for cell phone commands coded in graphical images.

\* \* \* \* \*